United States Patent [19]

Katayama et al.

[11] Patent Number: 6,073,054

[45] Date of Patent: *Jun. 6, 2000

[54] INFORMATION PROCESSING SYSTEM

[75] Inventors: Yasunori Katayama; Junzo Kawakami, both of Mito; Hiroyuki Kudo, Hitachi; Yoshiki Hirakouchi, Tokyo; Hiroaki Ishikawa, Kawasaki, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/537,570

[22] Filed: Oct. 2, 1995

Related U.S. Application Data

[63] Continuation of application No. 07/454,054, Dec. 20, 1989, abandoned.

[30] Foreign Application Priority Data

Dec. 23, 1988 [JP] Japan .................................. 63-323334

[51] Int. Cl.[7] .................................................. G05B 13/02
[52] U.S. Cl. .................................... 700/28; 700/2; 700/9; 700/40; 700/90; 700/91
[58] Field of Search ................................ 395/62, 200.31, 395/200.33, 200.38, 200.41; 706/10, 47, 48, 49, 903, 904; 700/28, 40, 2, 90, 91, 9

[56] References Cited

U.S. PATENT DOCUMENTS

| | | | |
|---|---|---|---|
| 4,530,045 | 7/1985 | Petroff ..................................... | 364/132 |
| 4,581,701 | 4/1986 | Hess et al. .............................. | 364/187 |
| 4,823,256 | 4/1989 | Bishop et al. .......................... | 364/187 |
| 4,868,763 | 9/1989 | Masui et al. ............................. | 395/11 |
| 4,982,340 | 1/1991 | Oyanagi et al. ........................ | 364/133 |
| 5,016,204 | 5/1991 | Simoudis et al. ...................... | 395/11 |
| 5,138,694 | 8/1992 | Hamilton ................................. | 395/11 |
| 5,299,287 | 3/1994 | Tsuruta et al. .......................... | 395/51 |
| 5,392,382 | 2/1995 | Shoppers ................................. | 395/10 |
| 5,473,773 | 12/1995 | Aman et al. ............................ | 395/650 |

FOREIGN PATENT DOCUMENTS

| | | |
|---|---|---|
| 56-40355 | 4/1981 | Japan . |
| 56-11353 | 9/1981 | Japan . |
| 57-079512 | 5/1982 | Japan . |
| 61-29901 | 2/1986 | Japan . |
| 62-075720 | 4/1987 | Japan . |
| 62-177462 | 8/1987 | Japan . |

OTHER PUBLICATIONS

Hogo Keiden Kogaku Denkigakkai Daigaku Koza (1981) p. 199.

International Conference on Large High–Voltage Electric Systems, Sep. 3, 1988, Paris, France, pp. 1–6; F. Hein et al.: Use of Expert Systems in Energy Control Centres.

I.E.E.E. Network, vol. 2, No. 5, Sep. 1988, NY, pp. 22–27; Joseph Pasquale: Using Expert Systems to manage Distributed Computer Systems.

*Primary Examiner*—William Grant
*Assistant Examiner*—Marc McDieunel
*Attorney, Agent, or Firm*—Kenyon & Kenyon

[57] ABSTRACT

An information processing system comprises a plurality of systems (1, 3, 4, 6) communicating through a transmission path (2) and performing a processing base on their own function. One of the plurality of systems acts as as an supervising system having a supervising function. The supervising system (1, 4) sets a goal for each of the plurality of systems, collects the processing result on each system and evaluates the processing result; and on the basis of the processing result, the supervising system sets a new goal for each system considering a goal of the entire system comprising said plurality of systems.

2 Claims, 33 Drawing Sheets

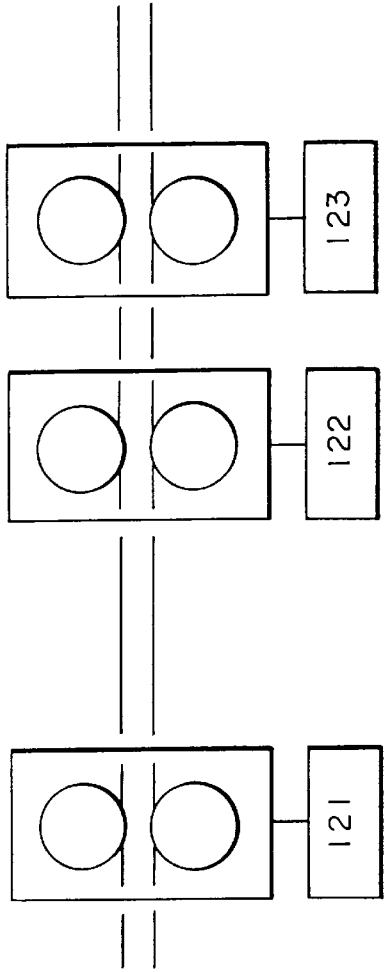

| | STATE OF COMPUTER SYSTEM 121 | STATE OF COMPUTER SYSTEM 122 | STATE OF COMPUTER SYSTEM 123 |
|---|---|---|---|
| BEFORE COOPERATION OPERATION | PLATE THICKNESS 2.5 mm<br>POWER CONSUMPTION 1100 KW | PLATE THICKNESS 1.0 mm<br>POWER CONSUMPTION 800 KW | PLATE THICKNESS 0.8 mm<br>POWER CONSUMPTION 800 KW |
| GOAL (1) | PLATE THICKNESS 2.4 mm | PLATE THICKNESS 1.1 mm | PLATE THICKNESS 0.7 mm |
| EXAMINATION RESULT (1) | POWER CONSUMPTION 300 KW<br>CLEARANCE 8.3 % | POWER CONSUMPTION 600 KW<br>CLEARANCE 150 % | POWER CONSUMPTION 900 KW<br>CLEARANCE 33 % |
| GOAL (2) | PLATE THICKNESS 2.6 mm | PLATE THICKNESS 0.9 mm | PLATE THICKNESS 0.7 mm |
| EXAMINATION RESULT (2) | POWER CONSUMPTION 900 KW<br>CLEARANCE 33 % | POWER CONSUMPTION 1000 KW<br>CLEARANCE 20 % | POWER CONSUMPTION 1000 KW<br>CLEARANCE 20 % |

I-S CURVE
: INVESTMENT SAVING CURVE

L-S CURVE
: LIQUIDITY PREFEREM MONEY SUPPLY CURVE

INFORMATION PROCESSING SYSTEM

This is a continuation of application Ser. No. 07/454,054 filed Dec. 20, 1989, now abandoned.

BACKGROUND OF THE INVENTION

The present invention relates to a large scale information processing system, and more particularly to an information processing system well is suited for constructing a high performance information processing system by dividing a system into plural sub-systems and causing them to cooperate with each other.

A large scale information processing system hitherto proposed includes, as disclosed in JPA-56-111,353 and JPA-56-40,344, functional code communication as a communication system composed of plural equivalent sub-systems called 'autonomous basic units', and sub-system failure detection as a method for detecting failure in the adjacent autonomous basic units by providing a detour in a double loop network, etc. These systems do not consider the functions of the sub-systems or any interference generated among the sub-systems. However, in actually effecting a large scale system of information processing or control, some interference will occur among the sub-systems so that the performance of the entire system does not improve even when the performance of the sub-systems themselves improves.

Moreover, that the autonomous basic units only play their own role (i.e., perform their own function), but do not consider the optimum over the entire system should be noted. The optimum over the entire system can be realized by a supervising or unifying control system for supervising the sub-systems in 'hierarchical control'. However, the idea of the supervising control system, has drawbacks. In particular its malfunction directly leads to failure in the entire system, and it must process a vast amount of information for the sub-systems.

In short, the above prior art control systems do not consider the interference among sub-systems nor do they consider the optimum location of the supervising function. This obstacle prevents improvements to the performance and reliability of the system.

SUMMARY OF THE INVENTION

An object of the present invention is to reduce the amount of processing in a supervising system, and also to remove the interference generated among sub-systems to optimize the entire system.

The above object is achieved by the present invention by partially shifting the supervising function of the supervising system to the sub-systems so that any sub-system can carry out the supervising function, and by repeating the communication between the supervising system and the sub-systems thereby to optimized the entire system.

In operation, the supervising system directs the sub-systems, evaluates the responses from the sub-systems and so operates so that the entire system is optimized. Thus, the supervising function which has been collectively carried out by the supervising system can be partially shifted to the sub-systems, thereby greatly reducing the amount of processing in the supervising system. Further, since any optional sub-system can carry out the supervising function, fixing the the supervising system, is not necessary obviating the failure of the entire system is possible due to that in the supervising system.

BRIEF DESCRIPTION OF THE DRAWINGS

FIGS. 19A and 19B to FIG. 22 are flowcharts of the concrete processings in the computer system in FIG. 17;

Figure 28:
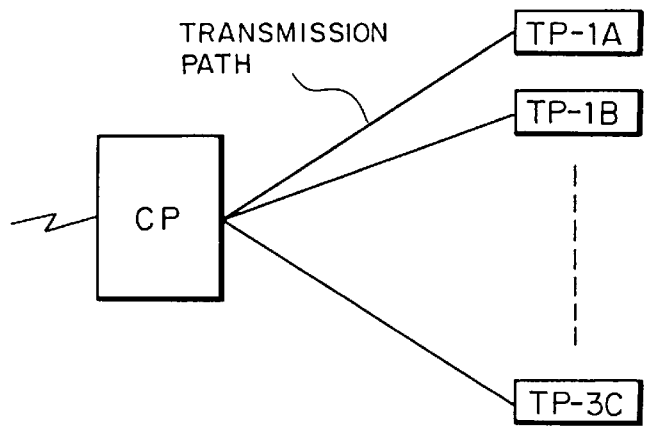
FIGS. 28 to 30 are views showing the communication system between a power substation master office and slave offices.
Figure 30:
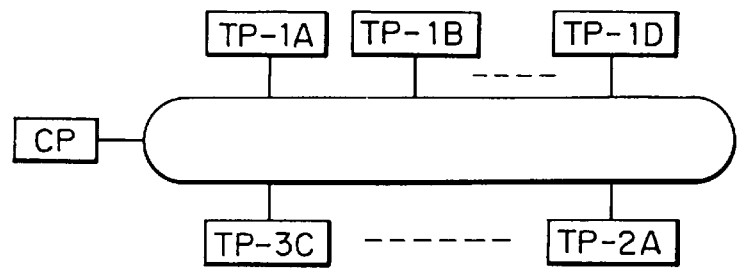
Figure 34:
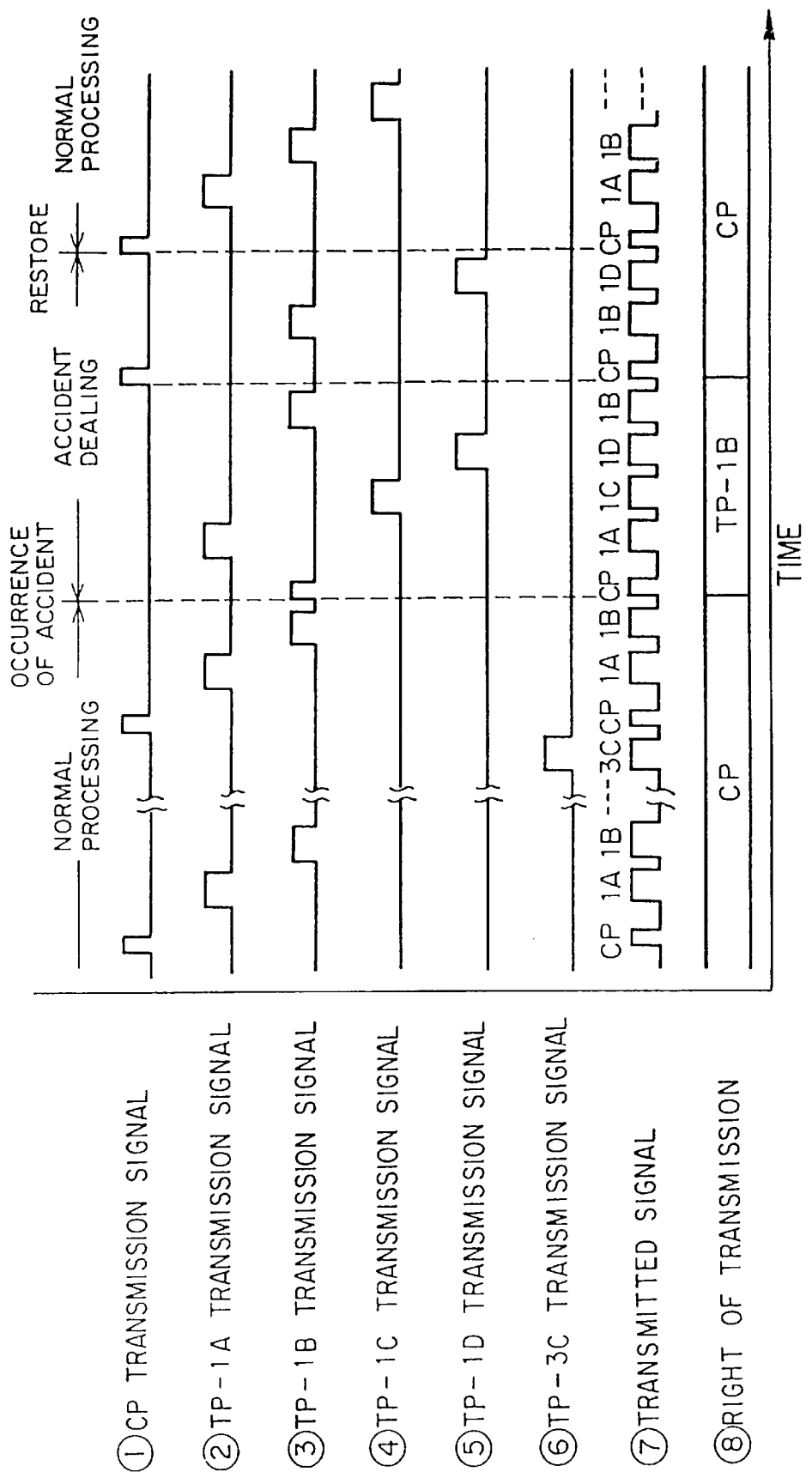
Figure 35:
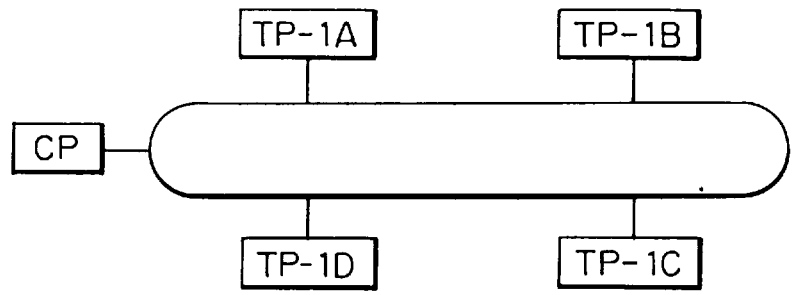
Figure 36:
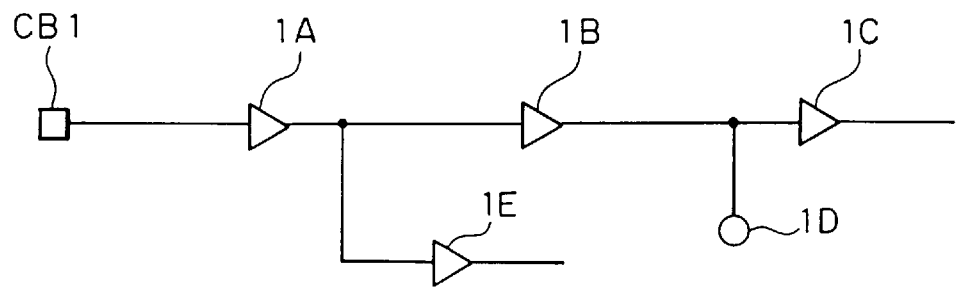
Figure 37:
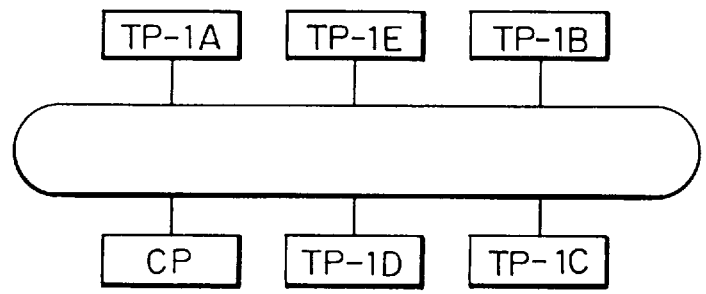
Figure 38:
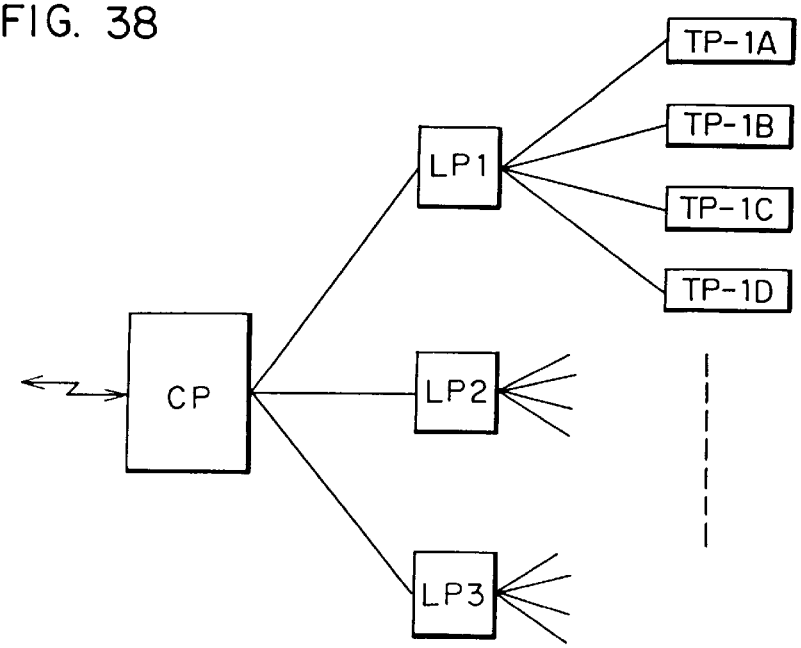
Figure 39:
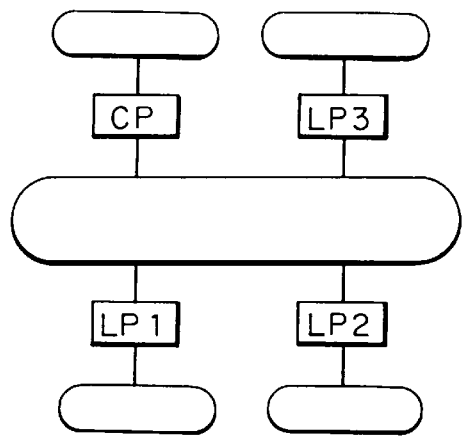
Figure 40:
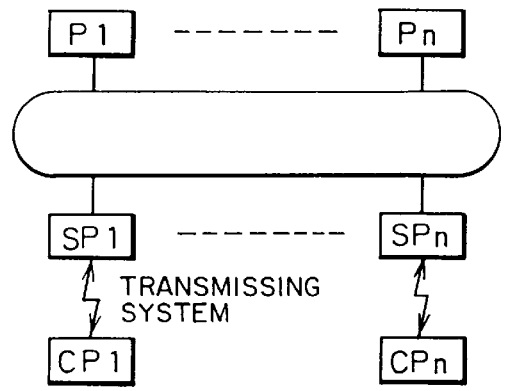

FIG., 33 is a flowchart of the processing procedure in the slave office;

FIG. 34 is a timing chart showing the signal flow;

FIG. 35 is a diagram showing the arrangement of the transmission system corresponding to one power distribution line;

FIG. 36 is a diagram showing the construction in which a branching line and switches are added to the power distribution line;

FIG. 37 is a diagram showing the construction of the transmission system corresponding to FIG. 37;

FIGS. 38 and 39 are diagrams showing the transmission systems which are in a hierarchical structure for each line in FIGS. 28 and 30, respectively; and FIG. 40 is a diagram showing the arrangement of a monitor control system connecting sales offices with sub-stations.

DETAILED DESCRIPTION

Figure 1:
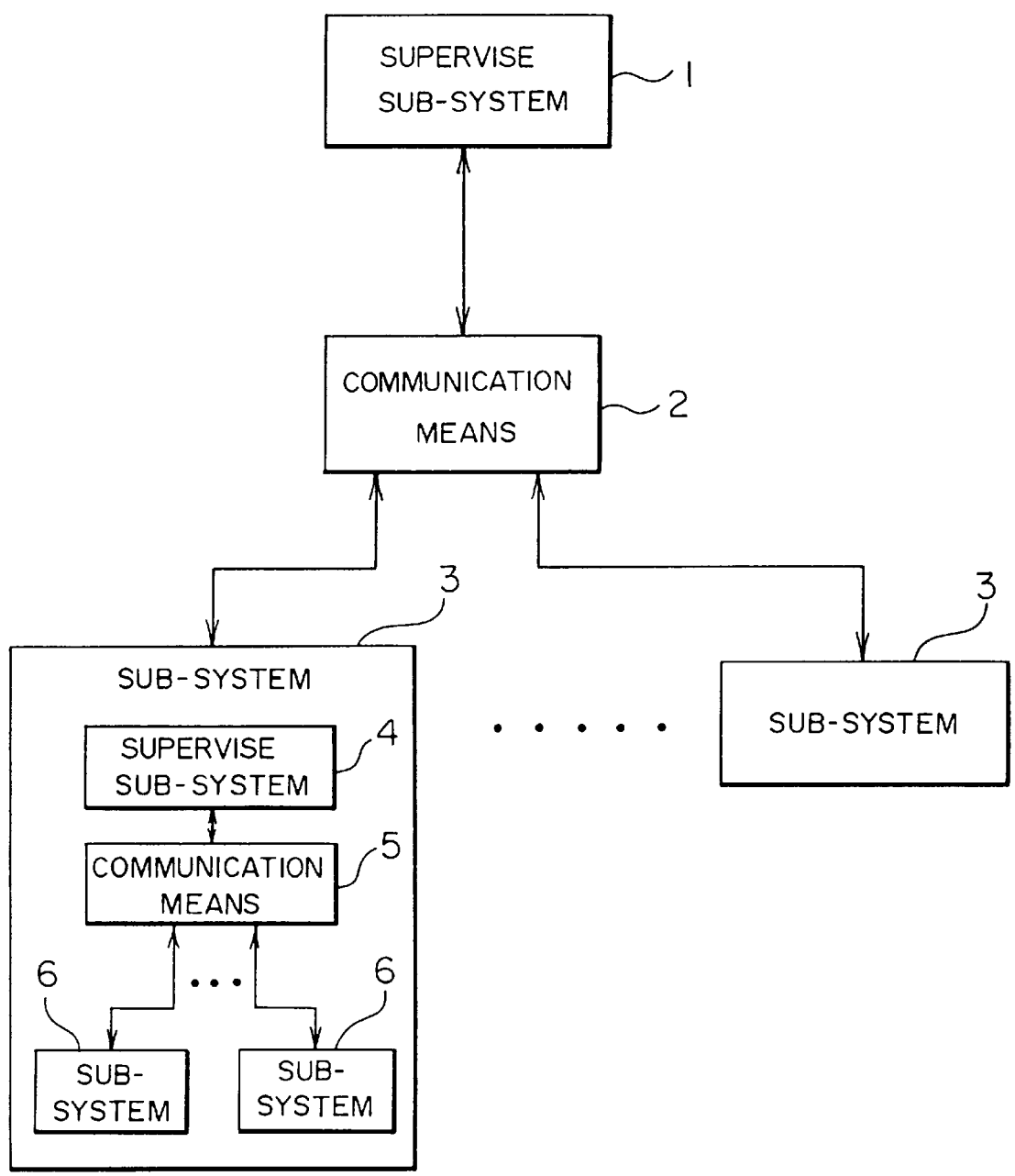
FIG. 1 is a block diagram of one embodiment of the present invention.

Referring to FIG. 1, one embodiment of the present invention will be explained.

A system according to the present invention is composed of supervising or unifying sub-system 1, a communication means 2, and one or more sub-systems 3. The supervising sub-system 1 or the sub-system 3 which is a component of the entire system is further composed of a supervising sub-system 4, a communication means 5, and one or more sub-systems 6, i.e. takes a kind of recurrent structure. The above supervising sub-systems 1 and 4 and the sub-systems 3 and 6 interchange information through the communication means 2 and 5.

Figure 2:
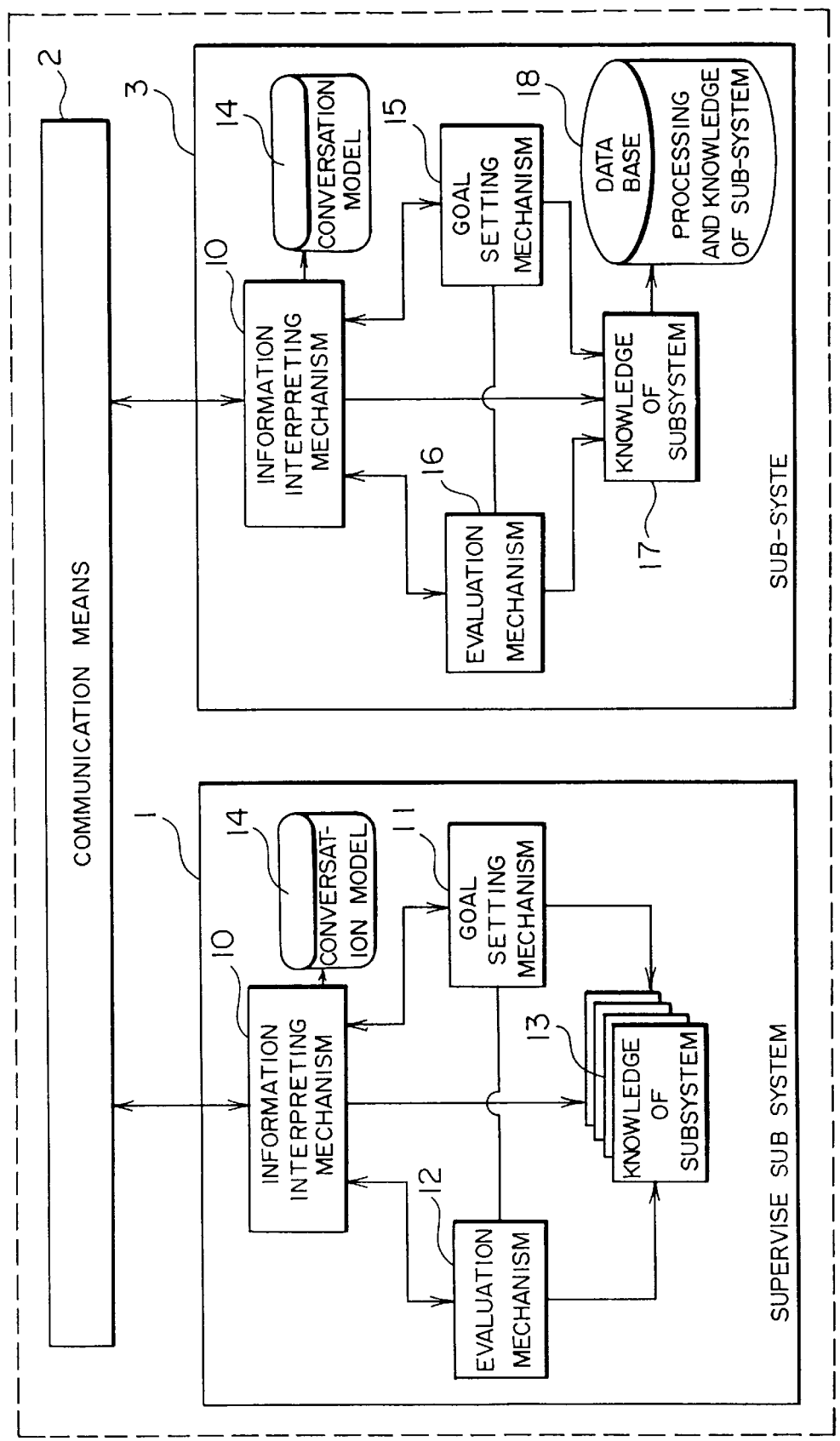
FIG. 2 is a block diagram showing the functions of a supervising sub-system and a sub-system.

FIG. 2 shows a functional block diagram of the supervising sub-system 1 and the sub-system 3, in which an information interpreting mechanism 10 for the supervising sub-system 1 is connected with the communication means 2. The information interpreting mechanism 10 has a protocol exchange like function,i.e. it interprets the contents of the information (data) provided from the communication means 2 to send the information to a goal setting mechanism 11, an evaluation mechanism 12, and knowledge 13 of the sub-system, and also compresses the amount of information from the goal setting mechanism 11, the evaluation mechanism 12 and the knowledge 13 of the sub-system using a conversation model 14. The information of the supervising sub-system 1 is sent to the sub-system 3 through the communication means 2. The information interpreting mechanism 10 in the sub-system 3 restores the sent information using the conversation model 14. The information interpreting mechanism 10 in the sub-system 3 sends the restored information to the goal setting mechanism 15, the evaluation mechanism 16 and the knowledge 17 of the sub-system, and also compresses the amount of information from the components 15, 16 and 17 to send out the compressed data to the communication means 2. Additionally, the information interpreting mechanisms 10 in the supervising sub-system 1 and the sub-system 3 have the same function and can be used for communication between the sub-systems 3. Further, where the conversation model 14 is not provided, the information is not compressed so that the information to be communicated will slightly increase. Meanwhile, if the supervising sub-system 1 sets all the goals in the sub-system 1, the goal setting mechanism 15 can be removed. The knowledge 17 of the sub-system refers to knowledge about the processing or function in that sub-system or any details relative to the processing; This knowledge is stored in a data base 18 for the processing and knowledge of the sub-system. On the other hand, the knowledge 13 relative to the sub-system 3 in the supervising sub-system 1 is knowledge obtained by abstracting and simplifying the sub-system knowledge 175.

This knowledge, which has been stored in the data base 18 of the sub-system 3, in response to a question from the supervising sub-system 1, is transferred to the supervising sub-system 1.

Figure 3:
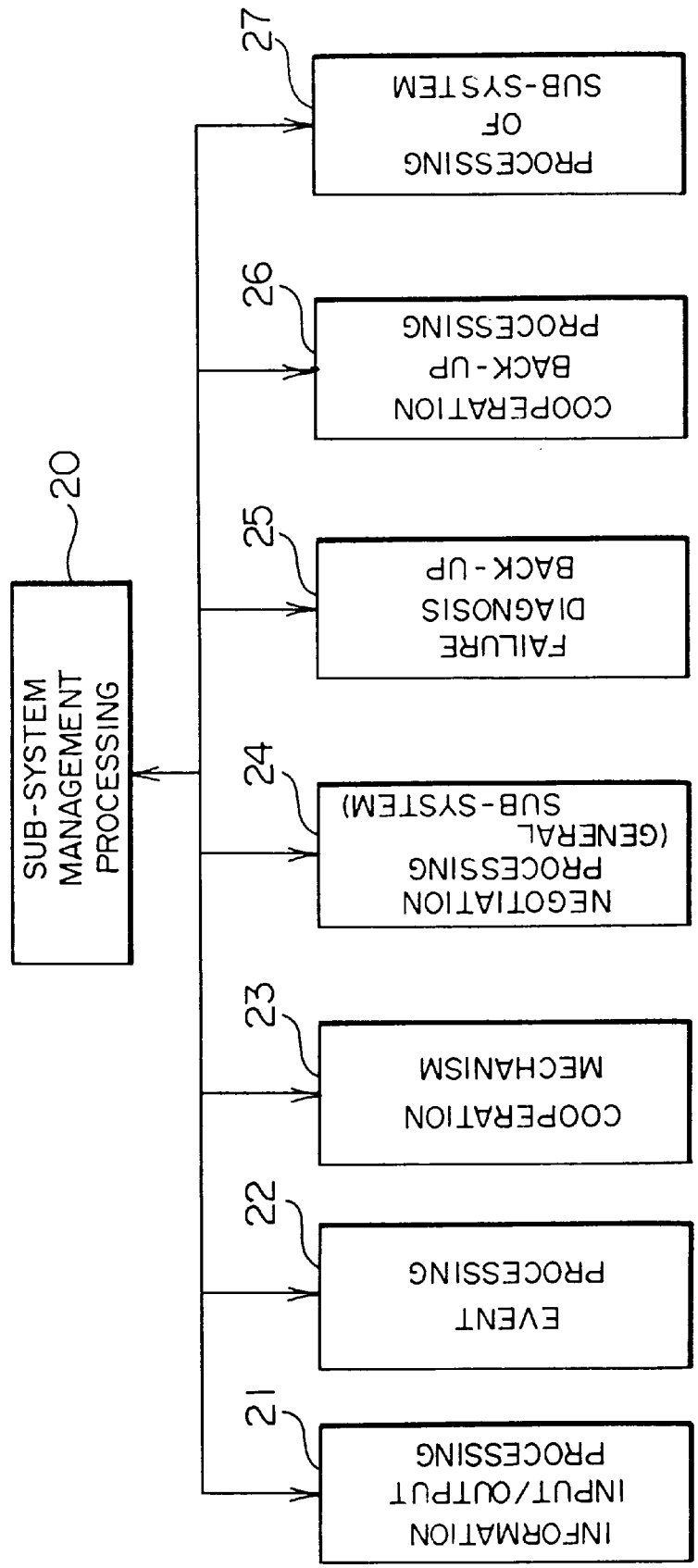
FIG. 3 is a view showing the organization of processings in the sub-system.

FIG. 3 shows the processing organization in the sub-systems including supervising sub-systems and general sub-systems. Under the sub-system management processing 20 for managing the allotment of processings, etc. like an OS (operating system ) for a computer, each sub-system carries out an information input/output processing 21 of interchanging information with the other sub-systems or an input/output device; an event processing 22 of activating the other processing in response to an interruption, a periodic activation or completion of a processing; a cooperation mechanism 23 required when operating as a supervising sub-system; a negotiation processing 24 (on the side of the sub-system) activated when operating as a sub-system; a failure diagnosis backup processing 25 of detecting the failure in the other sub-systems to take over a part of the function thereof and also informing remaining sub-systems that the failure occurred; several auxiliary processings 26 required to carry out a cooperation action; and a sub-system processing 27 inherently allotted to that sub-system. Not all these processings 21 to 26 are carried out, but they may be loaded from the other system as needed.

Figure 4:
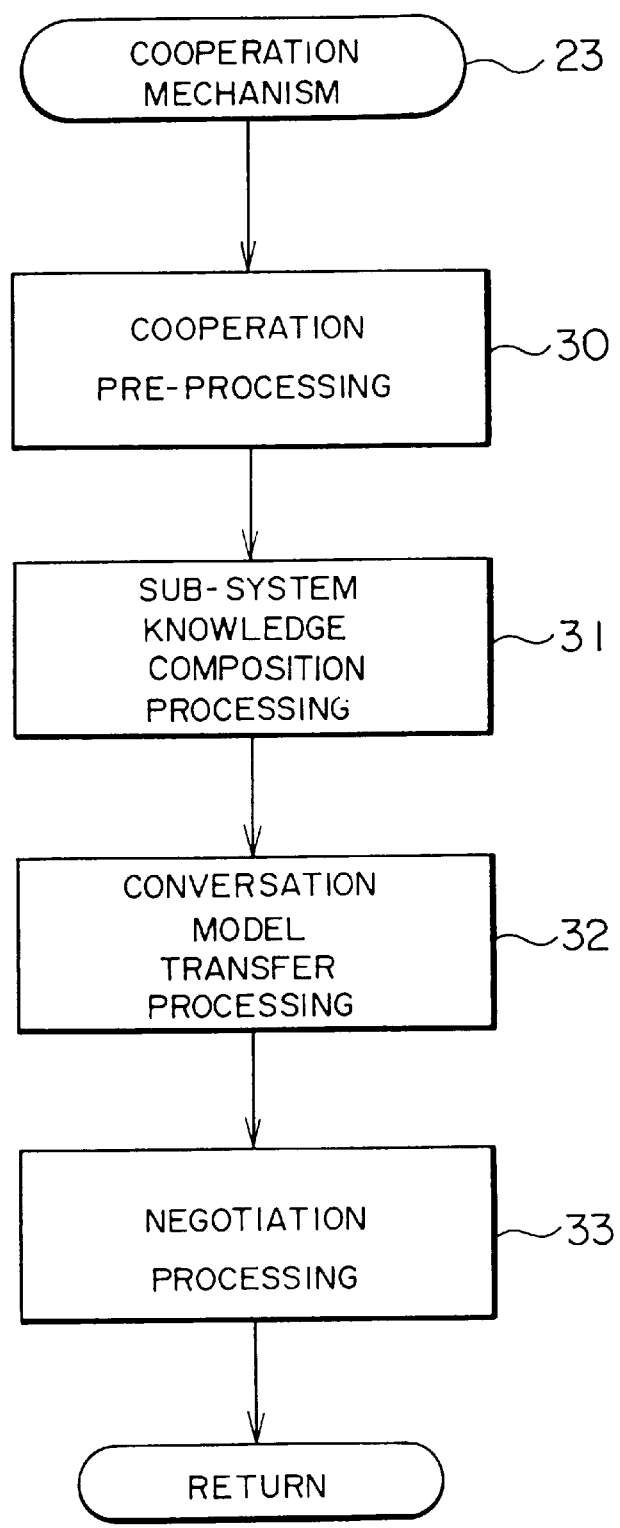
FIG. 4 is a flowchart of the cooperation mechanism in FIG. 3.

FIG. 4 shows the detailed procedure in the cooperation mechanism 23. It is assumed that when an event occurs, the cooperation mechanism 23 is activated through the sub-system managing processing 20 and the event processing 22. An event requires the system to solve a problem and take an action based on its solution. The contents of processing necessarily depends on the event type. When the cooperation mechanism 23 is activated by the event, the following processings are carried out. In cooperation pre-processing step 30, considering the kind of the event and the operational state of the sub-system, the supervising sub-system and the sub-systems participating in the cooperation mechanism are decided so that the activated sub-system smoothly operates; in sub-system knowledge creating step 31, if the supervising sub-system does not include a model of the sub-system, the knowledge for the sub-system is created through e.g. a question; in a conversation model transfer step 32, the conversation model required for the information (data) compression, which is performed to transfer the information through the communication means as mentioned above, is transferred to the other sub-system; and in a negotiation step 33, cooperation is realized by the negotiation with the other sub-system.

Figure 5:
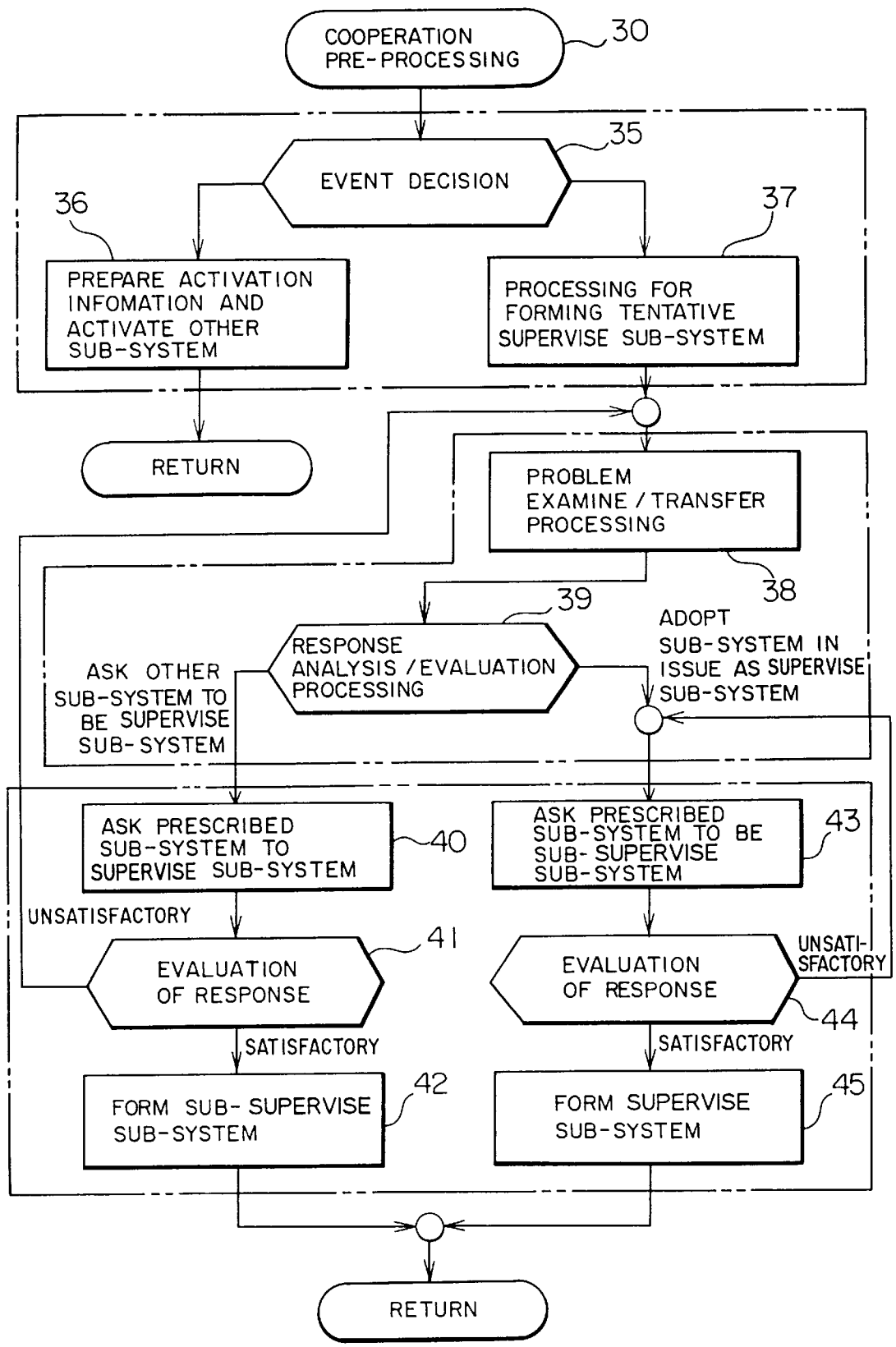
FIG. 5 is a flowchart showing the processing procedure of the cooperation pre-processing in FIG. 4.

FIG. 5 shows the details of the cooperation pre-processing 30. The cooperation pre-processing 30 is composed of the following steps. First, in step 35, an event decision is made to decide whether or not the function of a tentative supervising sub-system in the other sub-system should be executed. The event decision is step 35 determines it the other sub-system is more suitable as a tentative supervising sub-system. In step 36, information necessary to activate the other sub-system is prepared and the sub-system is activated (thereafter, the 25 processing is initialized). If the sub-system at issue is an event generating source in the event decision step, in step 37, that sub-system is adopted as a tentative supervising sub-system. In step 38, the problem required by the event is regulated, and the problem is communicated to other sub-systems to ask them to participate in the cooperation mechanism. In step 39 bared, on the responses from the other sub-systems, whether the sub-system in issue (tentative supervising sub-system) should be adopted as a supervising sub-system is decided. If the other sub-system has been determined to be suitable as a supervising sub-system in step 39, in step 40, an optimum sub-system is asked to be a supervising sub-system. In step 41, a response to the above request is evaluated. If the response is unsatisfactory, the problem is modified to execute step 38 again, and if the response is satisfactory. (i.e. the asked sub-system is suitable as a supervising sub-system) in step 42, the sub-system at issue is adopted as a sub-supervising sub-system to back up the supervising sub-system if and when the supervising sub-system falls in a defective state. If in step 39, it is decided that the sub-system should be adopted as a supervising sub-system, in step 43, considering several conditions, a predetermined sub-system is asked to be a sub-supervising sub-system. In step 44, a response from the predetermined sub-system is evaluated to decide if the step 43 should be executed again. If the response is unsatisfactory, the step 43 is carried out again, and if the response is satisfactory i.e. the sub-system to be a sub-supervising sub-system has been decided), the sub-system at issue is adopted as a supervising sub-system. Additionally, when the other sub-system is activated in the step 36, this sub-system activates the cooperative mechanism 23 therein through the sub-system management processing 20 and the event processing 22 in FIG. 3. In this case, if the cooperative mechanism 23 is not present in that sub-system, the sub-system management processing 20 copies the corresponding processing from other sub-system, which is to be executed.

Meanwhile, the steps 38, 40 and 43 which transfer information to the other sub-system to ask a response therefrom activates the cooperation auxiliary processing 26 in the other sub-system 26.

Figure 6:
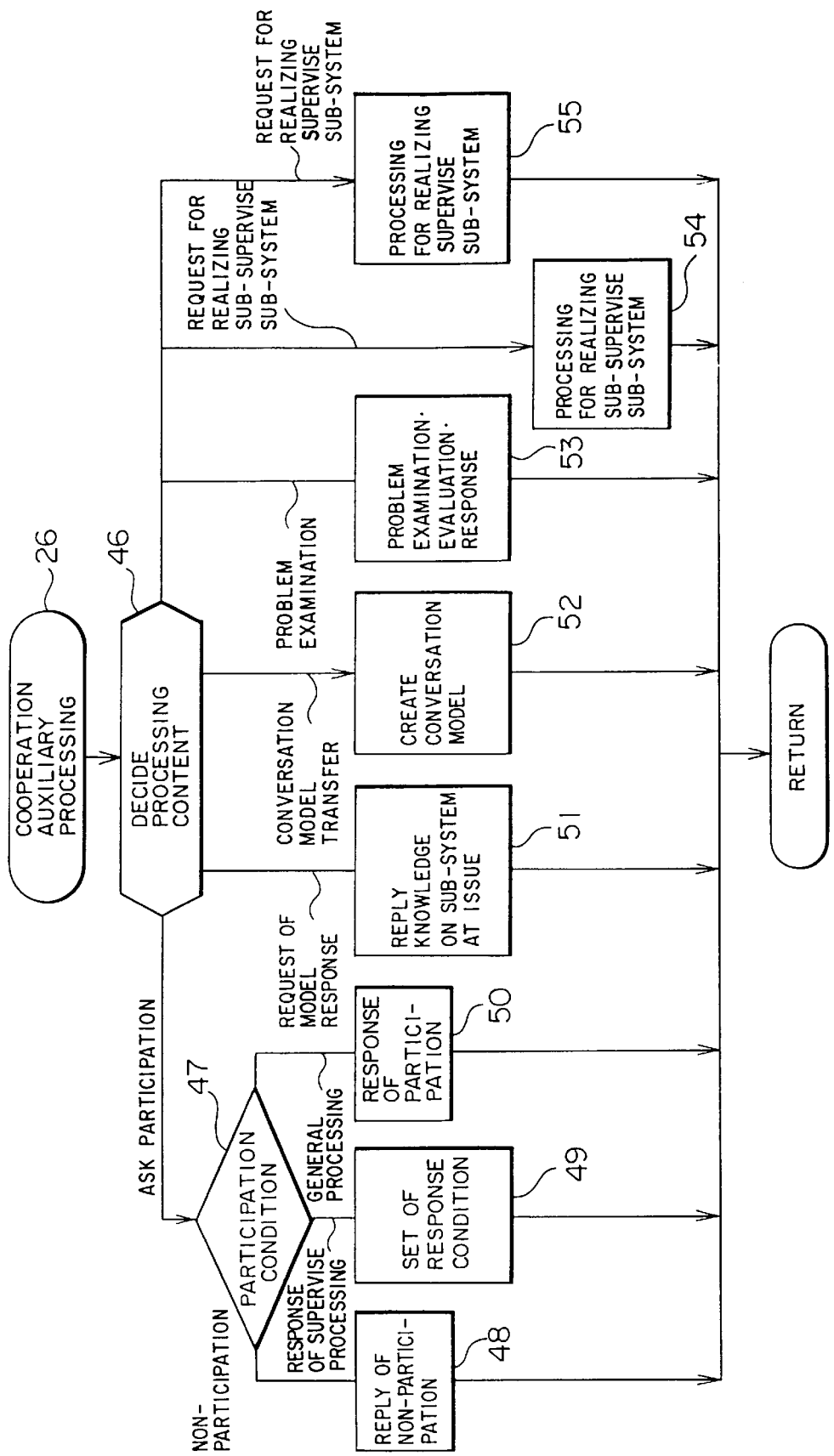
FIG. 6 is a view showing the processing contents in the cooperation auxiliary processing in FIG. 5.

FIG. 6 shows the details of the cooperation auxiliary (i.e. cooperation backup) processing 26. The cooperation auxiliary processing 26 is carried out by the following steps. In step 46, the item of a question relative to the cooperation mechanism from the other sub-systems are decided to activate the corresponding processing. If the question item is a request of participation in the cooperative mechanism, in step 47, the condition or problem for participation is decided. If the decision result is nonparticipation, in step 48, the reply of nonpaticipation is made. If it is decided that it better to respond as a supervising sub-system is, in step 49, the responding condition is set and the condition is replied. If the decision result is participation, in step 50, the reply of participation is made. If the decision in the step 46 is a demand of knowledge in the sub-system in issue, in step 51, the knowledge abstracted and simplified in relation to the processings of that sub-system is transferred to the supervising sub-system. If the decision in the step 46 is a demand of a conversation model, in step 52, a conversation model is produced in that sub-system. In step 53, in response to the step 38 in FIG. 5, the problem is studied, and evaluated and the result of evaluation is replied. In step 54, in response to the step 43 in FIG. 5, the processing necessary to adopt the pertinent sub-system as a sub-supervising sub-system is carried out. In step 55, in response to the step 40 in FIG. 5, the processing necessary to adopt the pertinent sub-system as a supervising sub-system is carried out.

Figure 7:
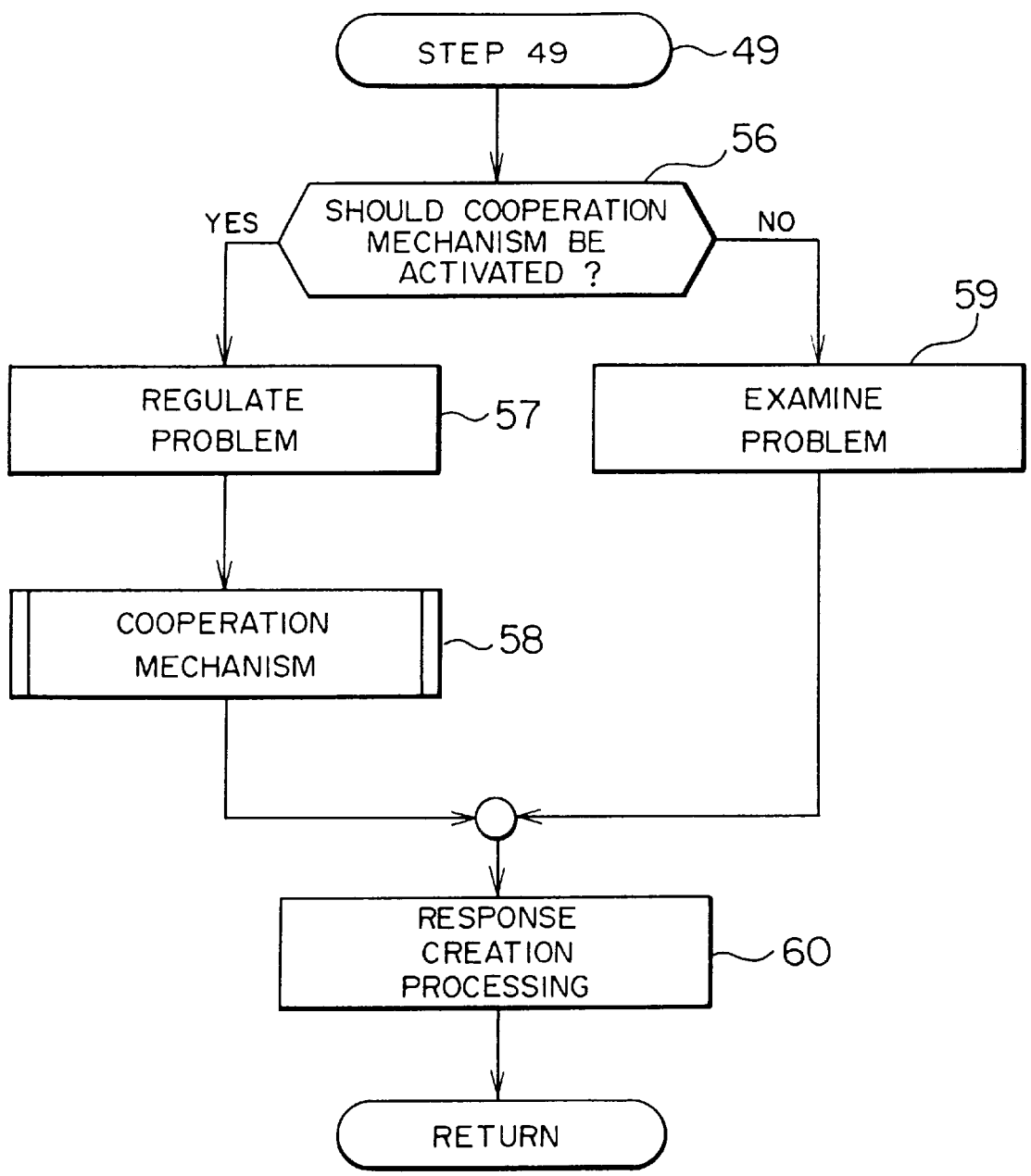
FIG. 7 is a flowchart of the step setting the response condition for the supervising sub-system in FIG. 6.

FIG. 7 shows the details of the processing of setting the condition for responding as the supervising sub-system in the step 49 in FIG. 6. This processing is carried out by the following steps. In step 56, whether the cooperative mechanism should be further activated is decided based on the problem from the tentative supervising sub-system to make an answer. If the problem cannot be solved by the goal setting mechanism 15 alone which is a problem solving mechanism in the pertinent sub-system, the the problem is regulated to be transferred to the cooperative mechanism. Subsequently, in step 58, the regulated problem is received as an event, and the cooperative mechanism 23 in FIG. 3 is activated to study the problem. If the problem can be solved by the goal setting mechanism 15 in the pertinent sub-system as the result of the decision of the step 56, the problem is studied by the goal setting mechanism 15. In step 60, in response to the result of the step 58 or 59, an answer is produced.

Figure 8:
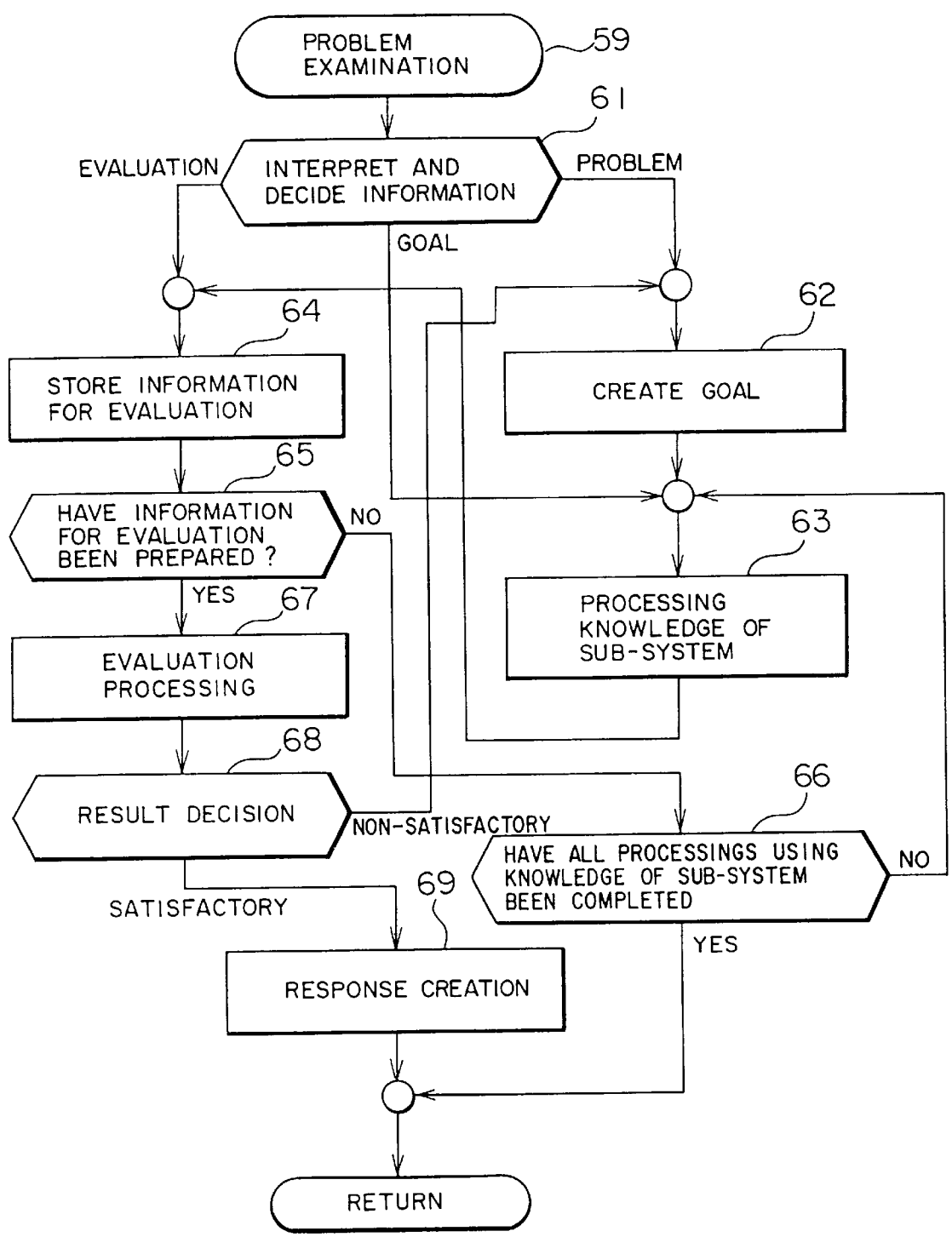
FIG. 8 is a flowchart of the problem considering step in FIG. 7.

FIG. 8 shows the details of the processing (step 59) of studying the problem in FIG. 7. This processing, which is activated in receipt of the information such as a problem, a goal, or an evaluation, is carried out by the following steps. In step 59, the received information is interpreted to decide if the information is the problem, the goal or the evaluation. If the information is the problem, in step 62, it is synthesized into a concrete procedure, i.e. a goal using the method of decomposing the problem into sub-goals to provide the procedure (as disclosed, for example, "JINKO CHINO NO GENRI", which is translation from "Theory of Artificial" by Nils J. Nillsson, by Y. Sirai, J. Tsujii and T. Sato and published by Japan Computer Association, pages 248 to 260. Subsequently, when the goal is provided, in step 63, the knowledge relative to the processings in the sub-system, e.g. knowledge described in the form of rule such as simulation or production system, is used to indicate how the pertinent sub-system acts for the goal or procedure. If the information is the evaluation in the decision of the step 61, in step 64, the information required for the pertinent sub-system to make the evaluation is stored. In step 65, whether or not all items of information have been prepared is determined not. If in step 66, all the processings using knowledge in the pertinent sub-system have been completed; is determined, step 63 is executed, and if it is 'YES', the processing is returned to the procedure in FIG. 7. On the other hand, if the answer in the step 65 is 'YES', namely, all items of information necessary for evaluation by the pertinent sub-system have been prepared, in step 67, the evaluation is performed. Subsequently, in step 68, whether the result of evaluation is satisfactory; is determined it is unsatisfactory, the step 62 of setting a goal is executed again, and if it is satisfactory, in step 69, an answer is produced.

Figure 9:
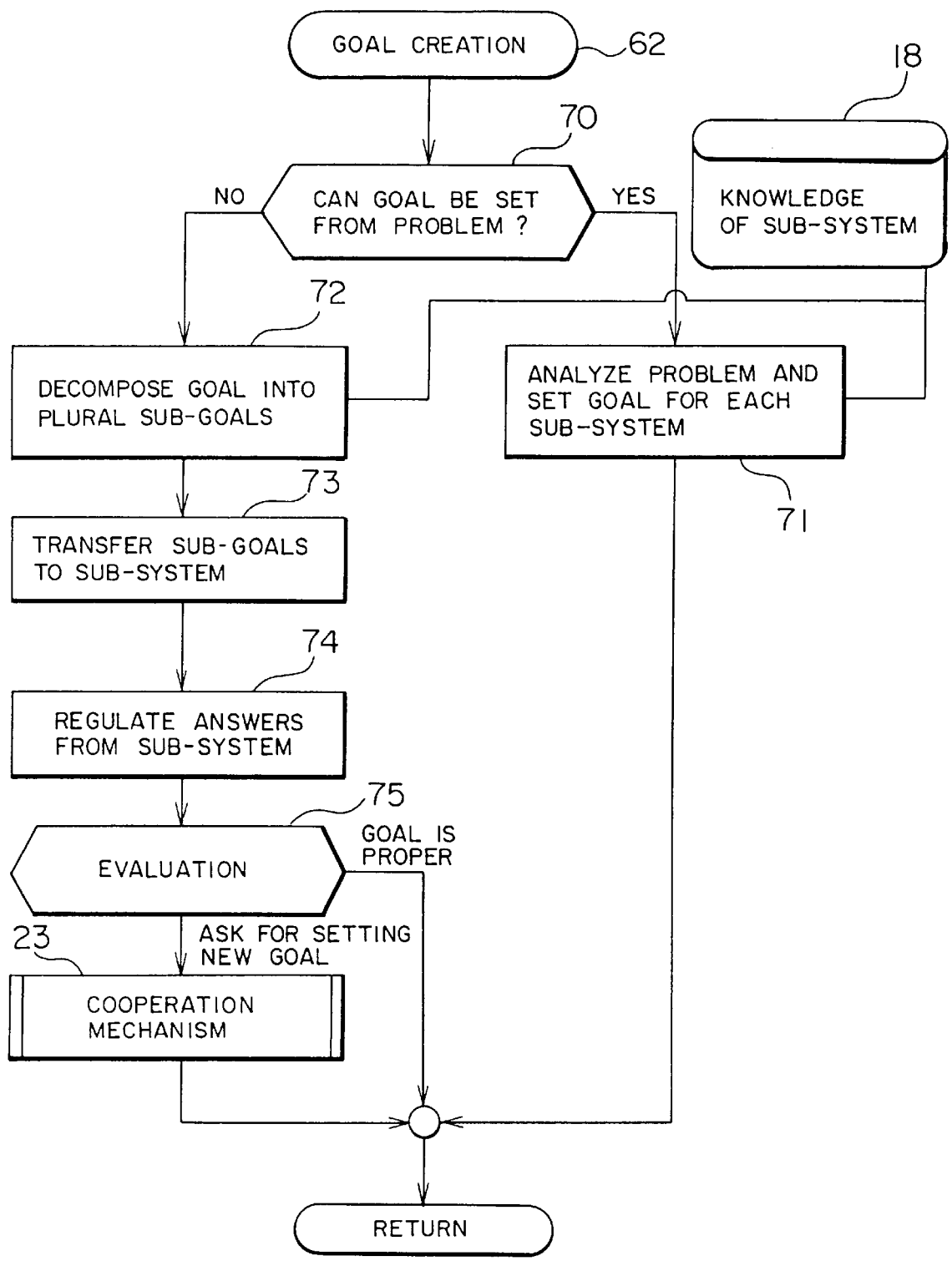
FIG. 9 is a flow chart of the purpose creating step in FIG. 8.

FIG. 9 shows the details of the processing of producing a goal (step 62 in FIG. 8) which is activated when a problem is given. This processing is carried out by the following steps. In step 70, whether or not a goal for each sub-system can be produced directly from the problem. If Yes, in step 71, the problem is analyzed using the knowledge 18 in the sub-system to set the goal for the sub-system. If not, in step 72, the problem or goal is decomposed into plural sub-goals using the knowledge 18 in the sub-system. In step 73, the sub-goals thus obtained are communicated to the sub-system. In step 74, the answers from the sub-system are collected and regulated. In step 75, the answers are evaluated. If the goal is proper, the processing is returned to the procedure in FIG. 8. If the goal is not proper, i.e. the goal producing mechanism U of the pertinent sub-system cannot properly set the goal, in step 23, the cooperative mechanism is asked for setting the goal.

Performance of the goal creation step shown generally in FIG. 8 and more specifically in FIG. 9, is consistent with the principles relating to robot problem solving described by Nillsson (cited above) as excerpted below.

Research on robot problem solving has led to many of our ideas about problem solving systems. Since robot problems are simple and intuitive, we use examples from this domain to illustrate the major ideas. In the typical formulation of a "robot problem" we have a robot that has a repertoire of primitive actions that it can perform in some easy-to-understand world. In the "blocks world," for example, we imagine a world of several labeled blocks (like children's blocks) resting on a table or on each other and a robot consisting of a moveable hand that is able to pick up and move blocks. Many other types of robot problems have also been studied. In some problems the robot is a mobile vehicle that performs tasks such as moving objects from place to place through an environment containing other objects.

Programming a robot involves integrating many functions, including perception of the world around it, formulation of plans of action, and monitoring of the execution of these plans. Here, we are concerned mainly with the problem of synthesizing a sequence of robot actions that will (if properly executed) achieve some stated goal, given some initial situation.

The action synthesis part of the robot problem can be solved by a production system. The global database is a description of the situation, or state, of the world in which the robot finds itself, and the rules are computations representing the robot's actions.

State descriptions and goals for robot problems can be constructed from predicate calculus . . . consider [the] robot hand and configuration of blocks . . . [t] his situation can be represented by the conjunction of formulas shown . . . The formula CLEAR (B) means that block B has a clear top; that is, no other block is on it. The ON predicate is used to describe which blocks are (directly) on other blocks. The "robot" in this situation is a simple hand that can move blocks about in a manner to be described momentarily. The predicate HANDEMPTY has value T just when the robot hand is empty, as in the situation depicted. Of course, any finite conjunction of formulas actually describes a family of different world situations, where each member can be regarded as an interpretation satisfying the formulas . . . (For brevity, however, we usually use the phrase "the situation" rather than "the family of situations."

Goal descriptions also can be expressed as predicate logic formulas. For example, if we wanted the robot of FIG. 7.1 to construct a stack of blocks in which block B was on block C, and block A was on block B, we might describe the goal as:

ON $(B, C) \wedge$ ON $(A, B)$.

Such a formula describes a family of world states, any one of which suffices as a goal.

Thus, goal creation can have various levels of complexity depending on the problem at hand. Nillsson's explanation is indicative of the fact that goal creation as a separate and distinct step is generally understood by those of skill in the art.

Incidentally, if the goal for each sub-system can be set directly from the problem in the step 70, only that step is carried out so that the other steps in FIG. 9 are not required.

Figure 10:
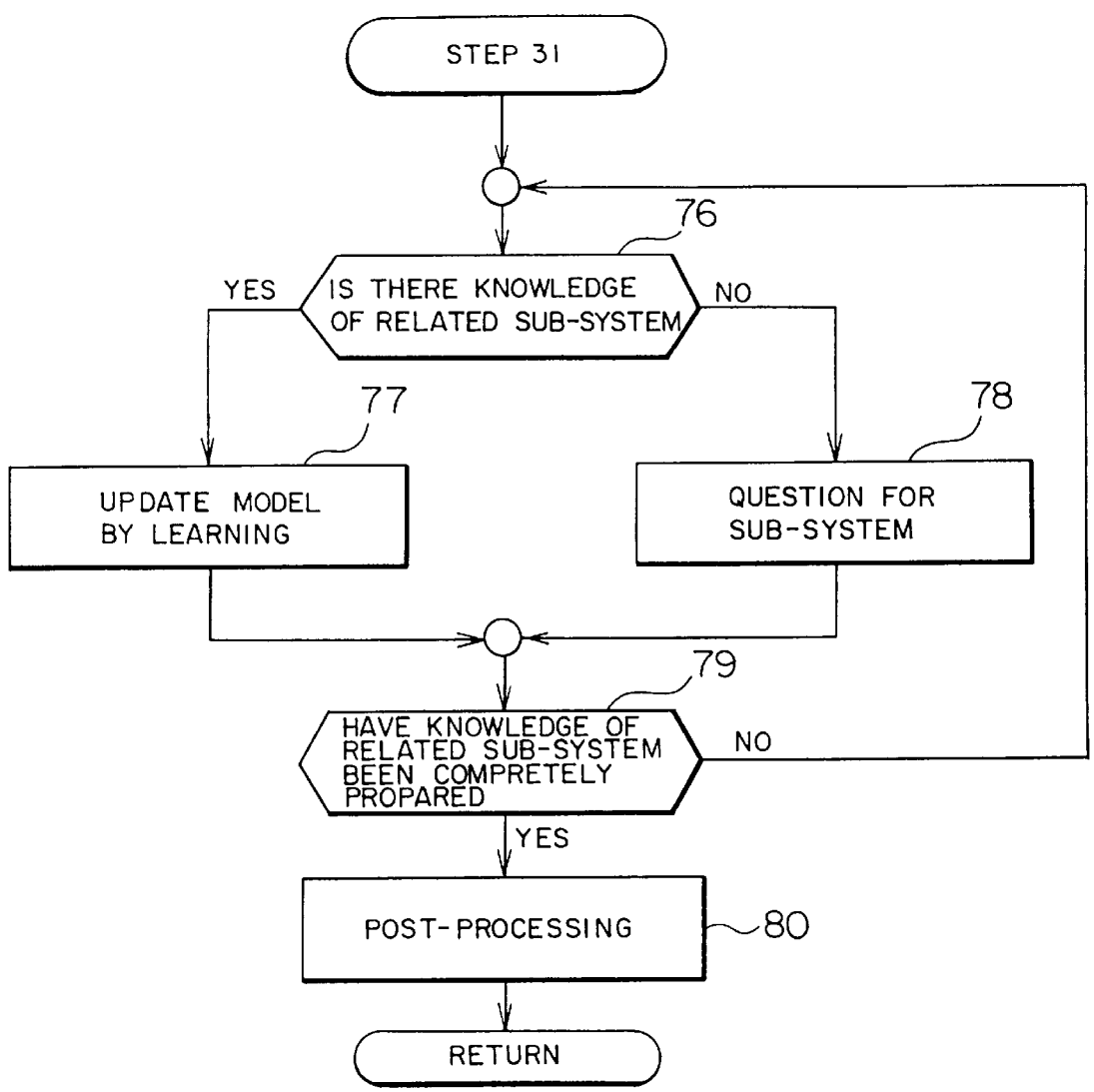
FIG. 10 is a flow chart of the sub-system knowledge creation processing in FIG. 4.

FIG. 10 shows the details of the sub-system knowledge producing processing (step 31 in FIG. 4). This processing is carried out the following steps. In step 76, whether or not knowledge for a related sub-system has already been in the pertinent sub-system is determined. If the corresponding model (i.e. knowledge about the function of the related sub-system) has been already prepared, it is updated by making the operation record of the other sub-system which is previously held, through the learning mechanism disclosed in e.g. Y. Anzai, Y. Saeki and T. Muto "LISP DE MANABU NINChI SINRIGAKU 1—GAKUSYU" published by Tokyo University Publishing, September Showa 56 (1981), pages 99 to 114 and 151 to 174. If the knowledge of the related sub-system is not present, in step 78, the pertinent sub-system obtains the knowledge from the target sub-system through questions and answers. In step 79, whether or not knowledge of the related sub-system has been completely prepared, is determined i.e. whether or not the knowledge required by the pertinent sub-system has been completely prepared, or if the updating has been completely made. If not, the step 76 is executed again. If 'YES', in step 80, a post-processing including several processings is carried out.

Figure 11:
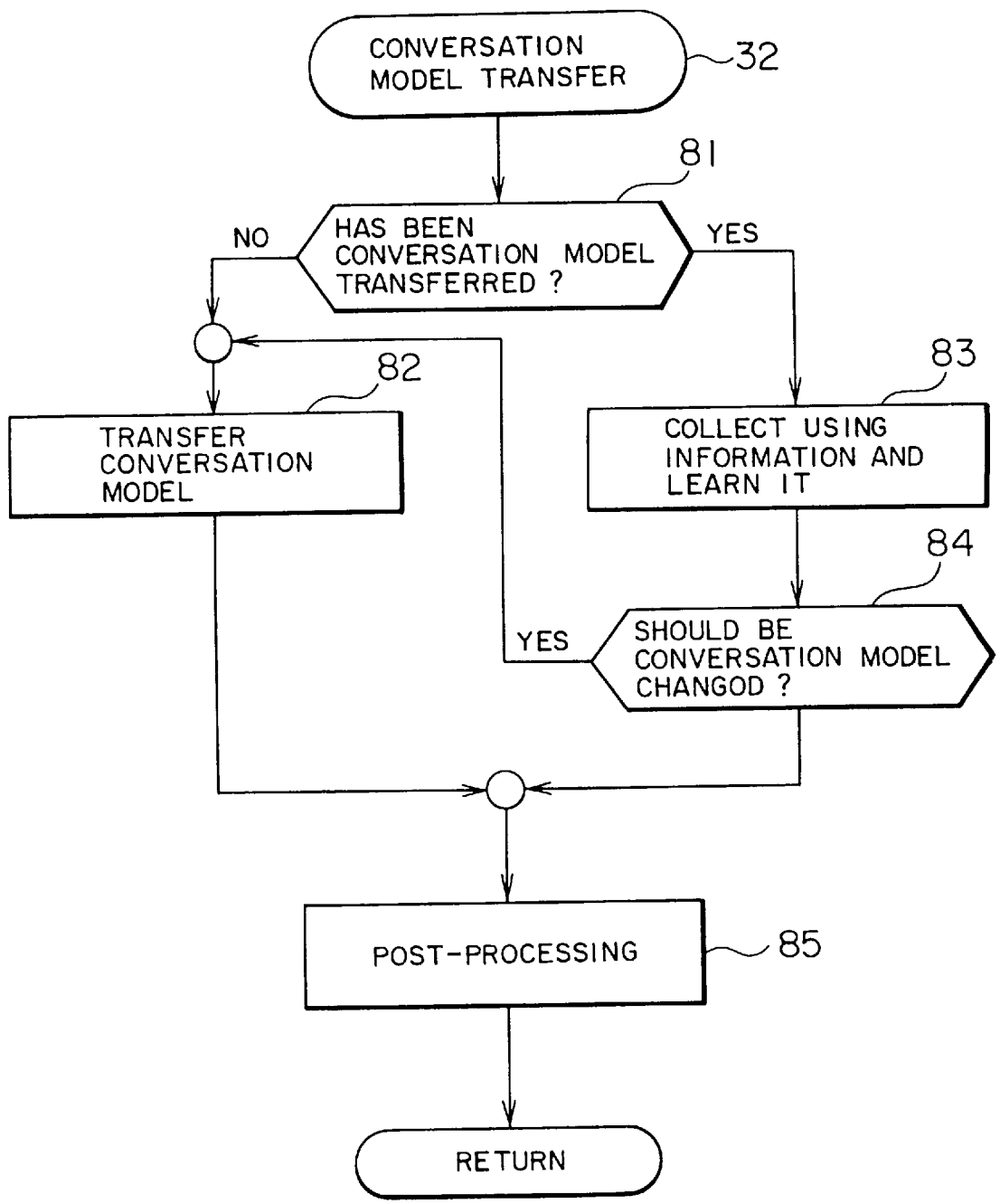
FIG. 11 is a flow chart of the conversation model transmission processing in FIG. 4.

FIG. 11 schematically shows the conversation model transfer processing (step 32 in FIG. 4). The conversation model is prepared to provide the model common to the sub-systems participating in the cooperative mechanism to the sub-systems and compress information communicated among the sub-systems.

The conversation model can use the knowledge constituted by a meaning network disclosed in "JINKO CHINO" published by Baif ukan, pages 188 to 217 (this book is a translation by M. Nagao and Y. Sirai from 'Artificial Intelligence' by P. H. Winston).

This conversation model corresponds to background explanation in a meeting by men; the participants can acquire the common knowledge from this background explanation. When the discussion is further advanced, the common conversation model is updated by learning, and the details can be communicated using less information on the basis of more knowledge. In other words, by analogy, increased knowledge permits men to use abbreviations or acronyms to communicate.

The actual conversation model communication processing is carried out by the following steps. In step 81, the sub-system participated in the cooperative mechanism in issue is queried whether or not they have the conversation model, and i.e., whether or not based on if the conversation model has been communicated to sub-system. If the conversation is not still communicated, the supervising sub-system 1 sends the conversation model (which is constituted by e.g. the meaning network) to the cooperative mechanism participating sub-system. If the conversation model has been conveyed to the participant, the knowledge of the conversation model is increased through the learning function executed in the step 77 in FIG. 10 using information obtained at the respective times. In step 84, the conversation model should be updated owing the increase of the knowledge by learning is determined. Finally, in step 85, a post-processing including several processings is carried out.

Figure 12:
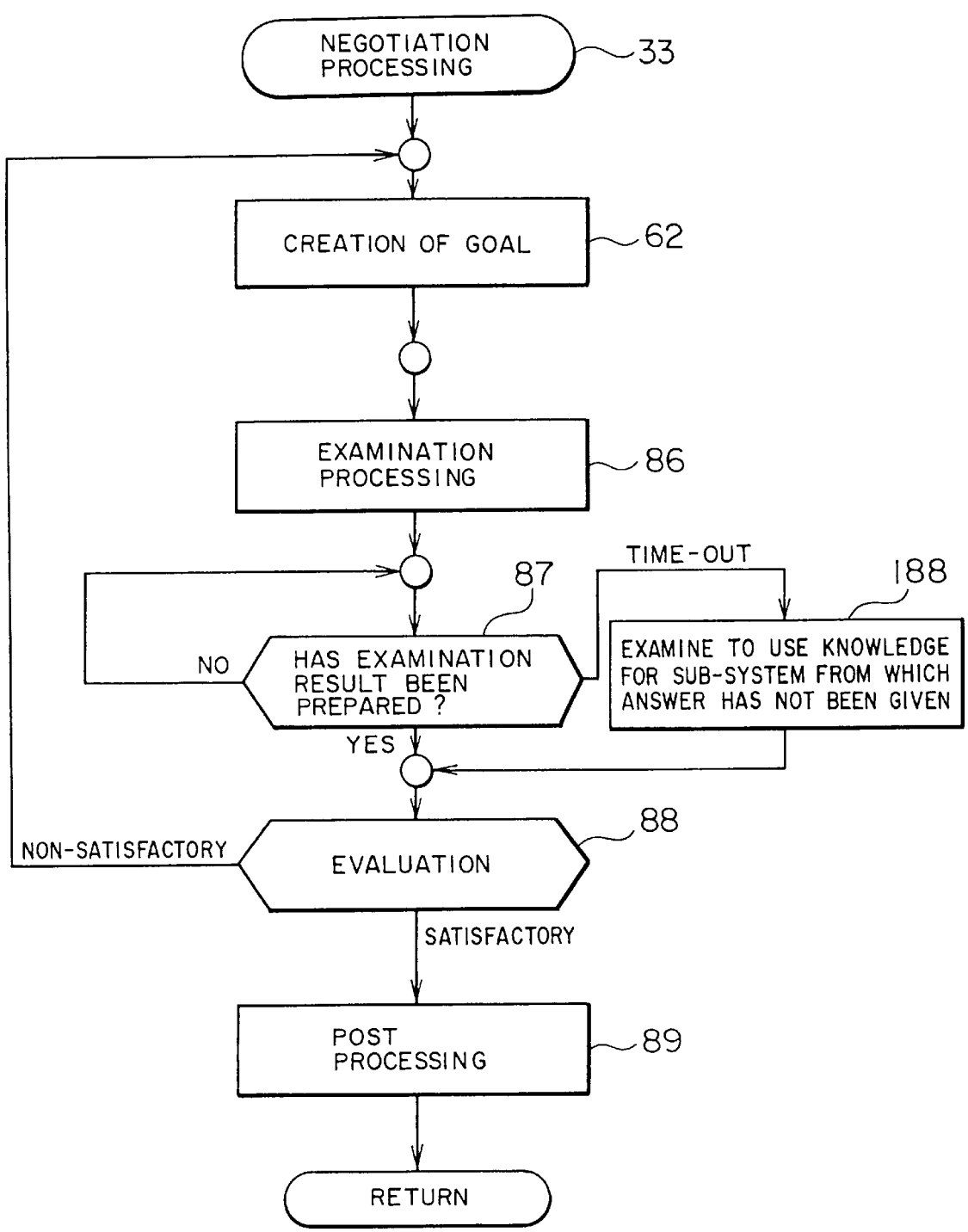
FIG. 12 is a flow chart of the negotiation processing in FIG. 4.

FIG. 12 shows the details of the negotiation processing (step 33 in FIG. 4). The negotiation processing is carried out by the following steps. In step 62, the goal is produced as described in connection with FIG. 9. In step 86, the goal is conveyed to the cooperation mechanism participating sub-system 3 to ask it to examine the goal. In step 87, the processing is postponed until the result of the examination has been prepared, or decision of 'time-out', which means that necessary data are not prepared after passage of a predetermined time, is made. If the result of examination has not been prepared before the time-out, step 87 is executed again. If the time-out occurs, in step 88, the knowledge possessed by the unifying sub-system in issue is used to examine the goal for the sub-system from which an answer has not been given. When the result of examination has been prepared, in step 88, evaluation is made on the basis of the examination result considering the atainment degree of the goal. If the evaluation result is unsatisfactory, the reason thereof is communicated to the step 62 so that the goal is set again. If the evaluation result is satisfactory, in step 89, a post-processing including the regulation of the evaluation result is executed.

Figure 13:
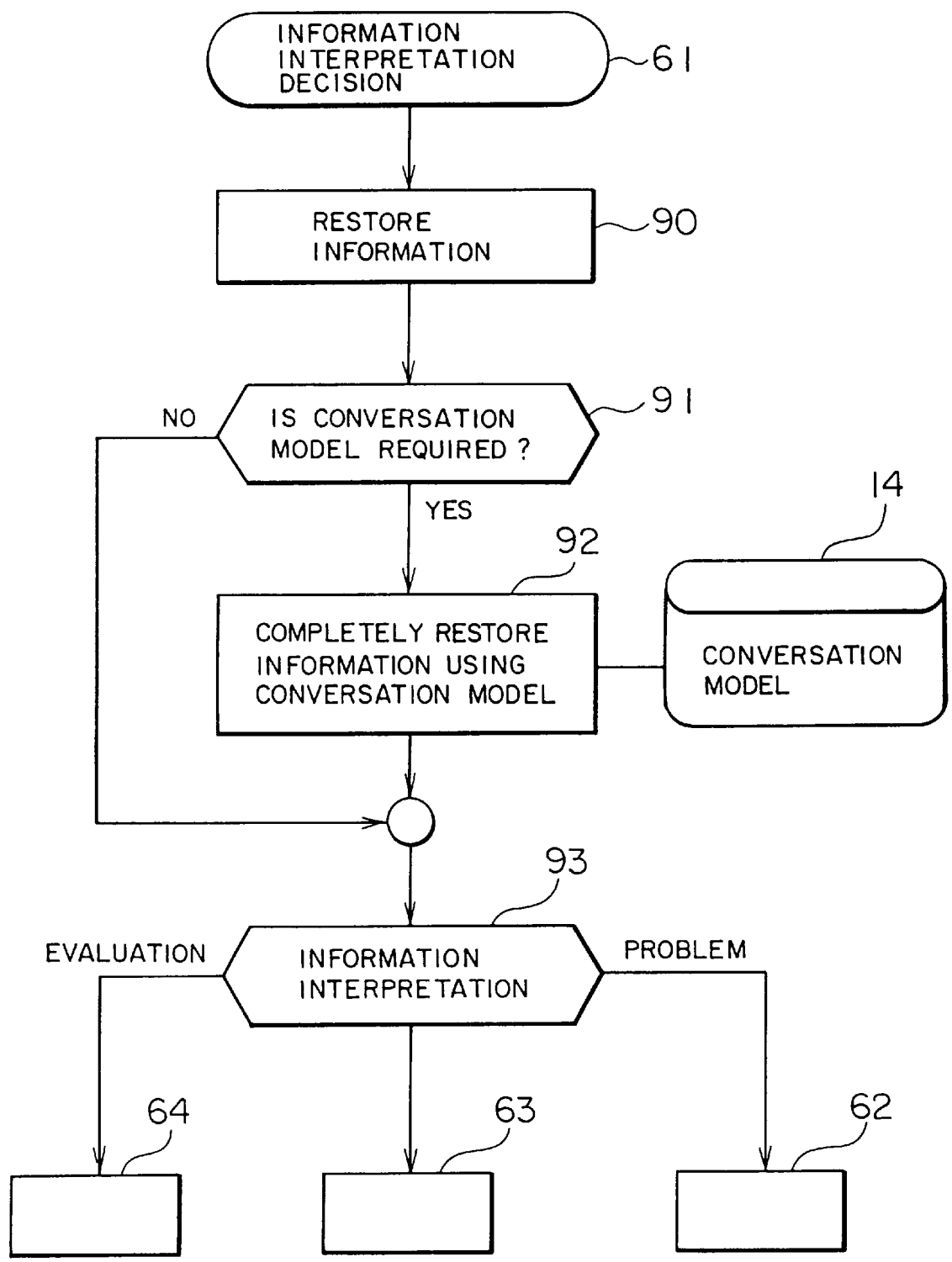
FIG. 13 is a flow chart of the information interpretation/decision in FIG. 8.

FIG. 13 shows the details of the information interpretation/decision processing (step 61 in FIG. 8) in succession to the information input/output processing 21 in FIG. 3. This processing step 61 is carried out by the following steps. In step 90, the information through protocol conversion, used for usual communication is restored so that it can be interpreted by the sub-system. In step 91, whether or not the restored information has been compressed using the conversation model is determined. If yes, in step 92, the information is completely restored using the conversation model 14. In step 93, the restored information is interpreted to execute steps 62, 63 and 64.

Figure 14:
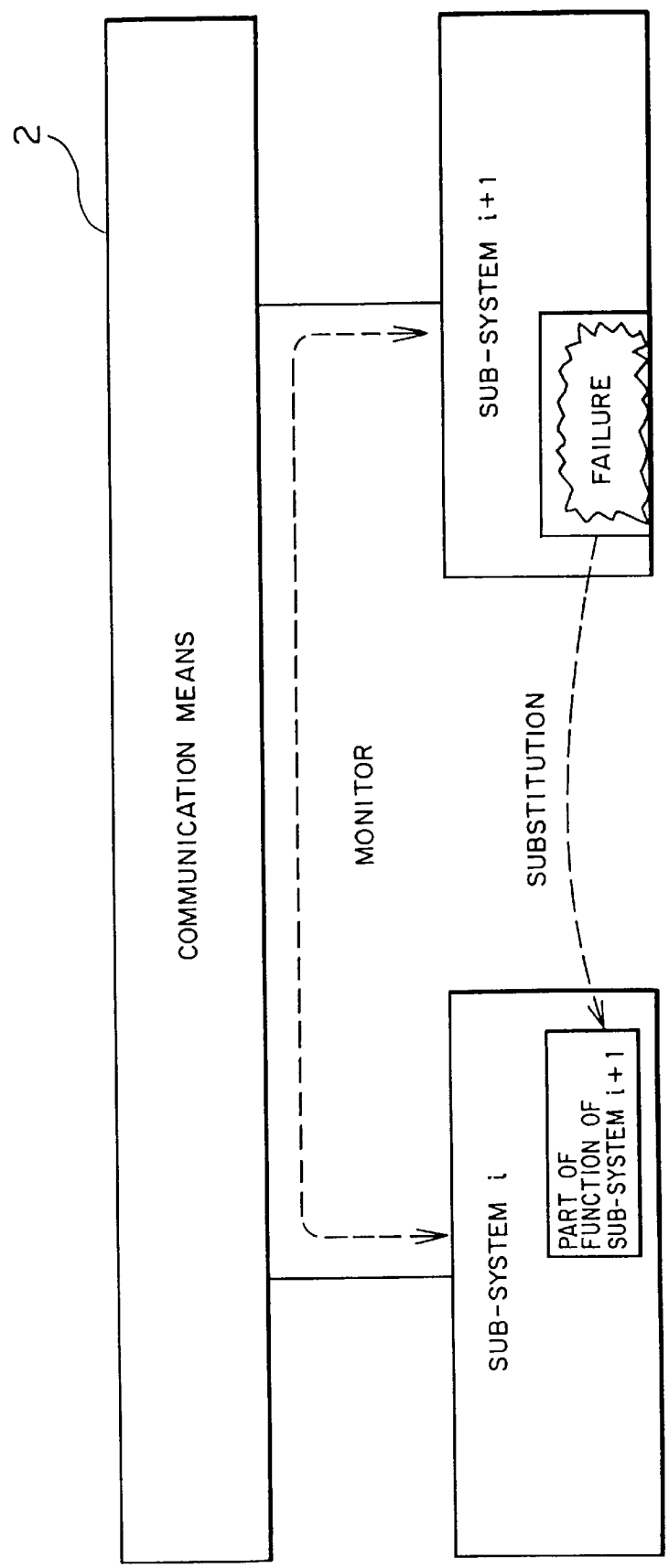
FIG. 14 is a conceptual view of failure detection by monitoring between sub-systems and the processing therefor.

FIG. 14 shows the concept of the failure detection and the back-up therefor carried out through mutual monitoring between sub-systems. It is assumed that sub-system i monitors sub-system i+1, and the sub-system i acts as a sub-unifying sub-system while the sub-system i+1 acts as a unifying sub-system.

Figure 15:
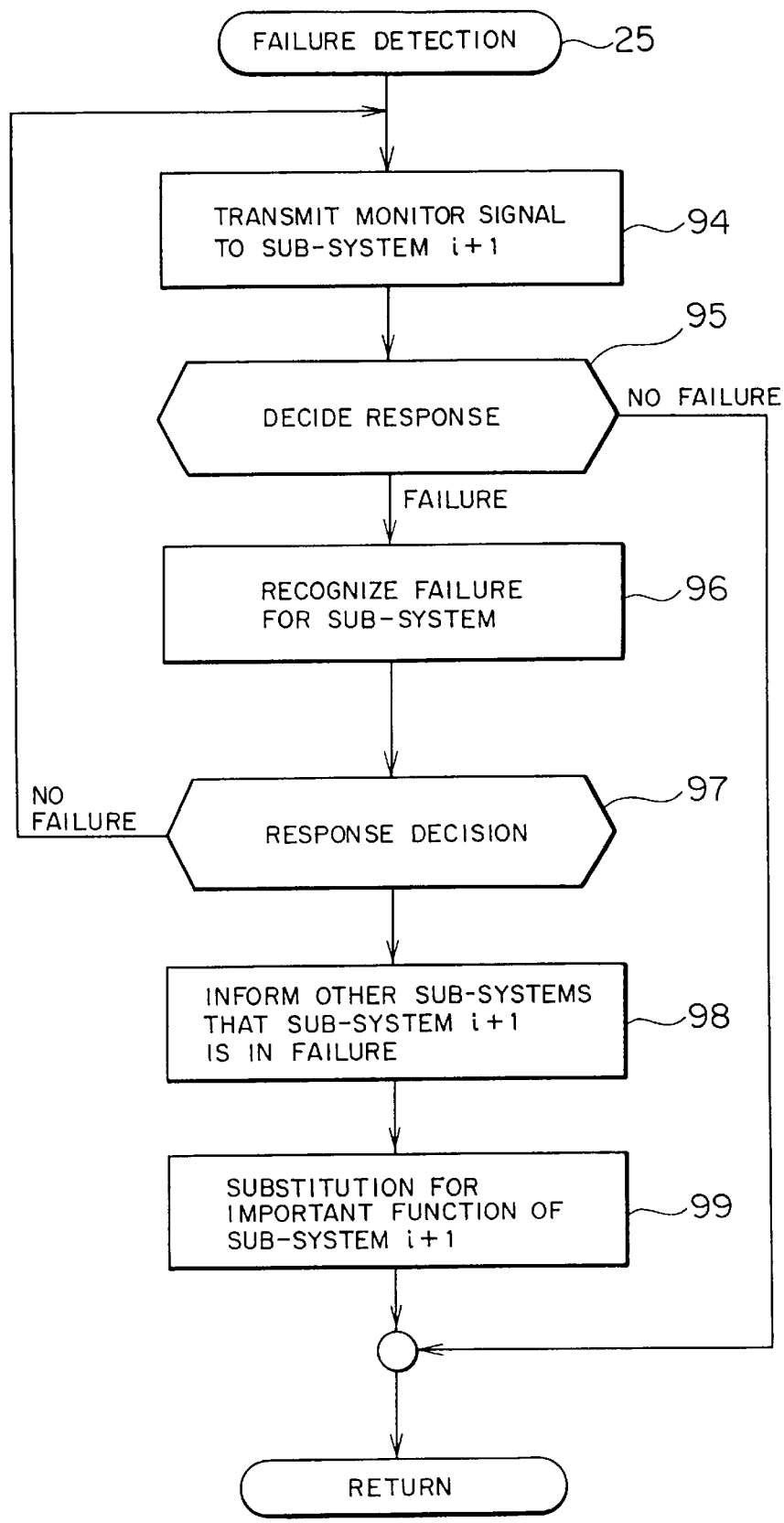
FIG. 15 is a flowchart of the failure diagnosis back-up processing in FIG. 3.

FIG. 15 shows the details of the failure detection/back-up processing 25 in the monitoring sub-system i. This processing is carried out by the following steps. In step 94, a signal for monitoring is sent to the sub-system i+1 at regular intervals. In step 95, decision is made on a response from the sub-system i+1; if no response is still offered from the sub-system i+1 after passage of a predetermined time, or the response not expected has been offered, the decision that the sub-system i+1 is in its failure state is made. In the case of the failure decision, in step 96, prescribed information for failure diagnosis is sent to the sub-system i+1 to recognize the failure again. In step 97, the response from the sub-system is further decided; if the response is normal, the step 94 is carried out again. If the response in the step 97 is abnormal, in step 98, the sub-system 3 participating in the cooperative sub-system is informed that the sub-system is in the failure state. Finally, in step 99, the sub-unifying sub-system i backs up the unifying sub-system i+1 to newly execute the important function, e.g. cooperative mechanism of the unifying sub-system i+1 therefor whereby the cooperative mechanism can be operated. The operation of the system described so far will be explained in connection with a metal production system which is an application of the present invention.

Figure 16:
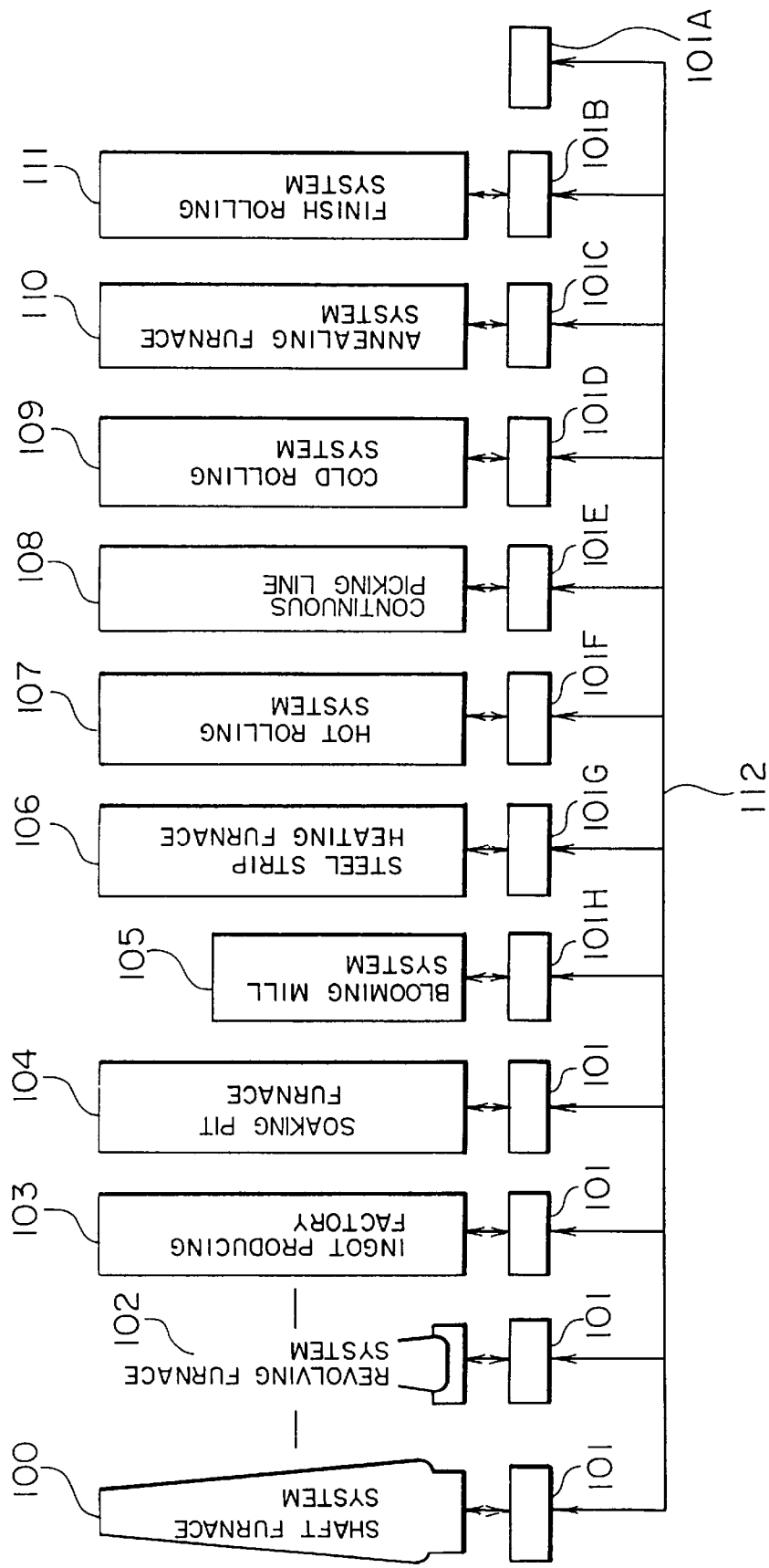
FIG. 16 is a diagram showing the system organization when the present invention is applied to a metal production system.

FIG. 16 shows the flow of a system for producing steel plates from material in an iron steel industry. This system flow is composed of a shaft furnace system 100 in which iron material is entered and the temperature, material and other factors are controlled by a control computer system 101; a revolving furnace system 102 in which the pig iron produced in the shaft furnace system 100 becomes steel; an ingot producing factory 103 in which iron ingots are produced; a holding furnace 104 in which the ingots are soaked; a blooming mill system 105 in which steel strips are produced; a steel strip heating furnace 106 in which the steel strips are heated; a hot rolling system 107 in which steel is produced; a successive acid washing system 108 in which rust on the steel surface is removed; a cold rolling system 109 in which steel plates with high accuracy are produced; an annealing system 110 in which the steel having the property indispensable as products are produced; and a finish rolling system 111 in which the products are completed. It should be noted that the respective systems 102 to 111 are connected with the corresponding control computer systems 101 so that they can faithfully execute their own function and the control computer systems 101 can exchange information through a network 112. In the case where owing to the change in the property of the steel during the hot rolling step, the the steel contains a large amount of carbon to be hard, the control computer 101F recognizes from its control result that several parameters in the Hill's approximation equation, and reports this fact to the a control computer 101A which is a supervising control system.

In response to the event received from the control computer 101F, the control computer 101A can activate the cooperative mechanism to report to the control computer system 101D corresponding to the cold rolling system 109 that the rolling schedule should be changed and several parameters given by the control computer 101F. These parameters are reflected to the set-up control 130, etc. in FIG. 18 described later.

Figure 17:
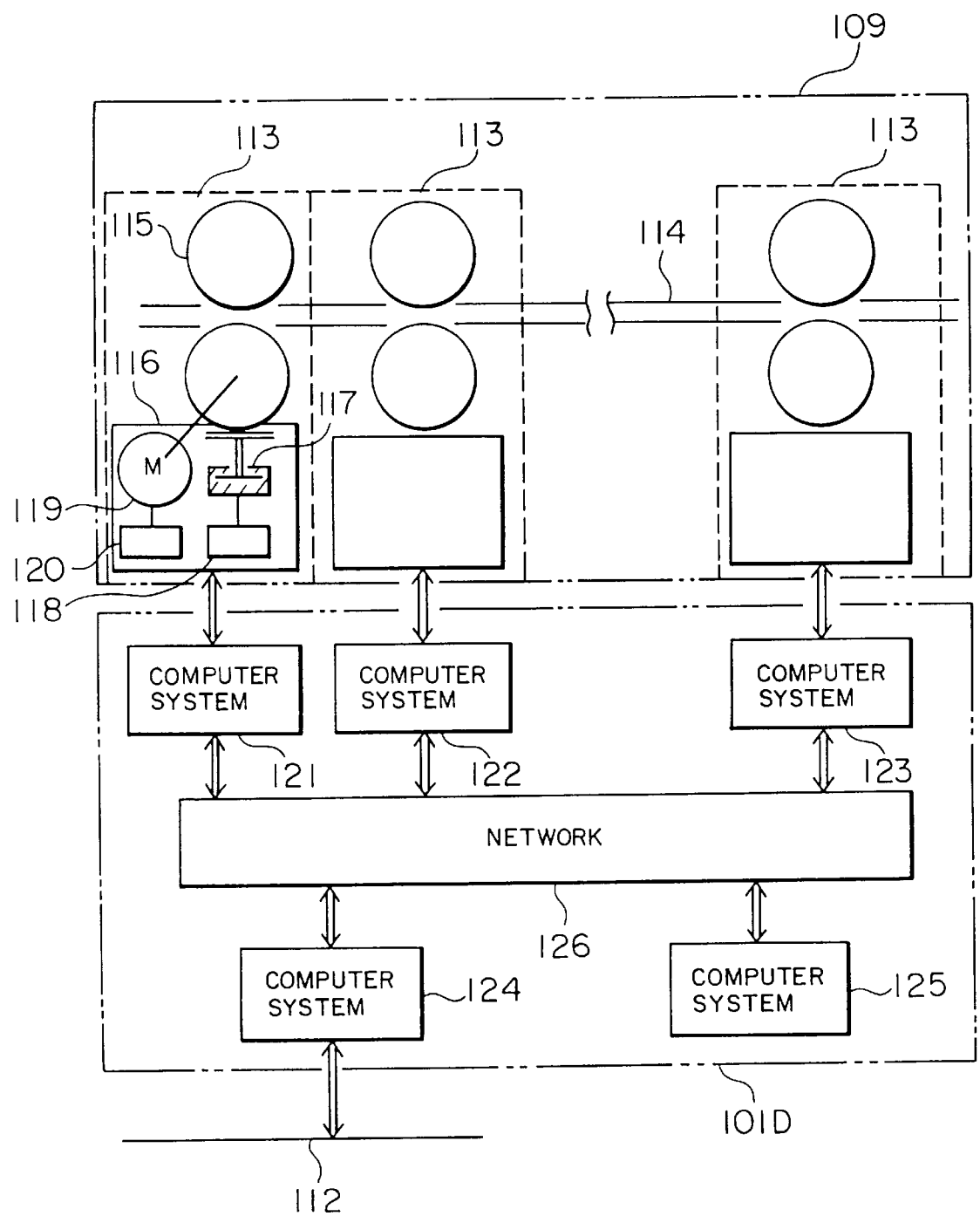
FIG. 17 is a block diagram of the arrangement of the cold rolling system and the control computer system therefor.

FIG. 17 shows the details of the cold rolling system 109 and the corresponding control computer system 101D.

The cold rolling system 109 is composed of one or plural rolling stands 113, in which steel material succesively passes the rolling stands 113 to provide a desired plate thickness. Each rolling stand includes a pair of rolls 115 and a controller for controlling the rolls 115 so as to provide the desired plate thickness. The controller 116 is composed of an oil pressure depressing device 117 for controlling the interval between the rolls, a controller 118 for controlling the device 117 by a microcomputer, a motor 119 for controlling the speed of the rolls 115, and a controller 120 for controlling the motor 119 by a microcomputer.

In operation, steel material is rolled out thinly by the rolling force of the oil pressure depressing device 117 applied to a pair of rolls and also by the tension produced owing to the difference in rolling speed between the adjacent rolls.

The control computer system 101D sends a command to the controller 116 to control the rolling system 109 so that the system 109 can produce the steel having a desired plate thickness. The control computer system 101D is composed of computer systems 121 to 123 for controlling the corresponding stands, a gate way computer system 124 for exchanging information through a network 112, a computer system 125 for determining the operating point of the roller, and a network 126 serving as a communication means for information exchange among these computer systems 121 to 125.

Figure 18:
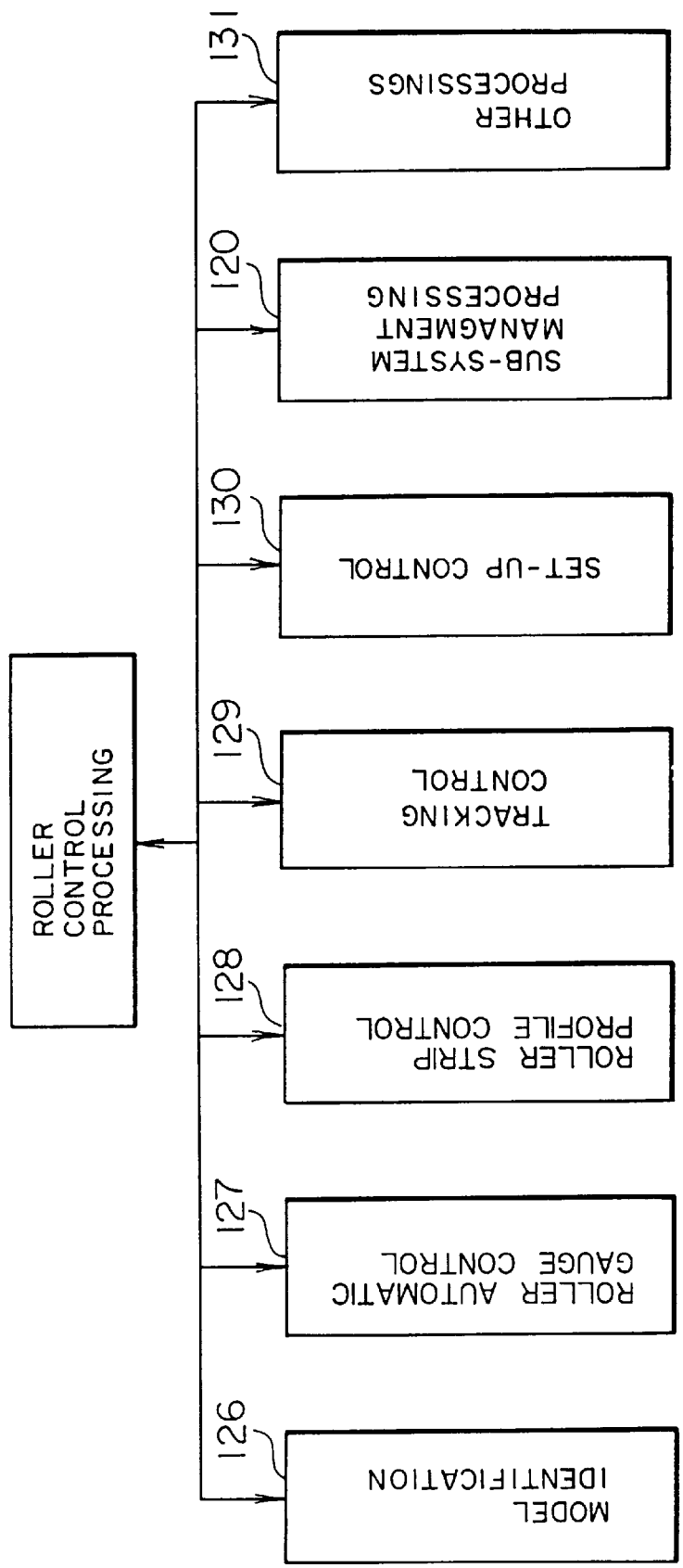
FIG. 18 is a diagram showing the the function organization of the computer system in FIG. 17.

FIG. 18 shows the function organization in the processing of the computer system 121. This is composed of the following stages. The roller has great non-linearity and the characteristic of the steel material is varied owing to the composition of the material to be rolled, the abrasion state, etc. so that in stage 126, a model for a control target is identified. In stage 127, the states such as the plate thickness, tension, etc. in the roller are fed back to provide a desired characteristic of the roller. In stage 128, the shape of the steel in a width direction of the rolls in the roller is controlled. In stage 129, when the steel material shifts from a prescribed stand to a subsequent stand, the information about the above prescribed stand is sent to the subsequent stand in synchronism with the shift of the steel material (tracking control). In stage 130, an optimum solution of a static operating point is provided by means of DP (dynamic programming) technique or the like, using the model of a control target obtained by the stage 126 and the control result on the upstream side (e.g. the parameters given by the control computer 101F for the hot rolling system 107 in FIG. 16) (set-up control). In stage 120, the sub-system is managed, and in stage 131, the other processings are carried out.

Now, it is assumed that the rollers of the roller are expanded owing to heat which is loss generated in the rolling operation, and the characteristic of the control target has varied, and also assumed that the computer system controlling the rolling stand with the greatest load is the system 121 in FIG. 17.

Further, it is assumed that the other processing 131 compares commands for the roller from the computer system 121 with the states of the roller (e.g. plate thickness, and tension), and generates an event when having recognizes that they are greatly different; the processing 131, therefore, serves to generate an event when the characteristic of the steel has varied greatly.

Figure 19A:
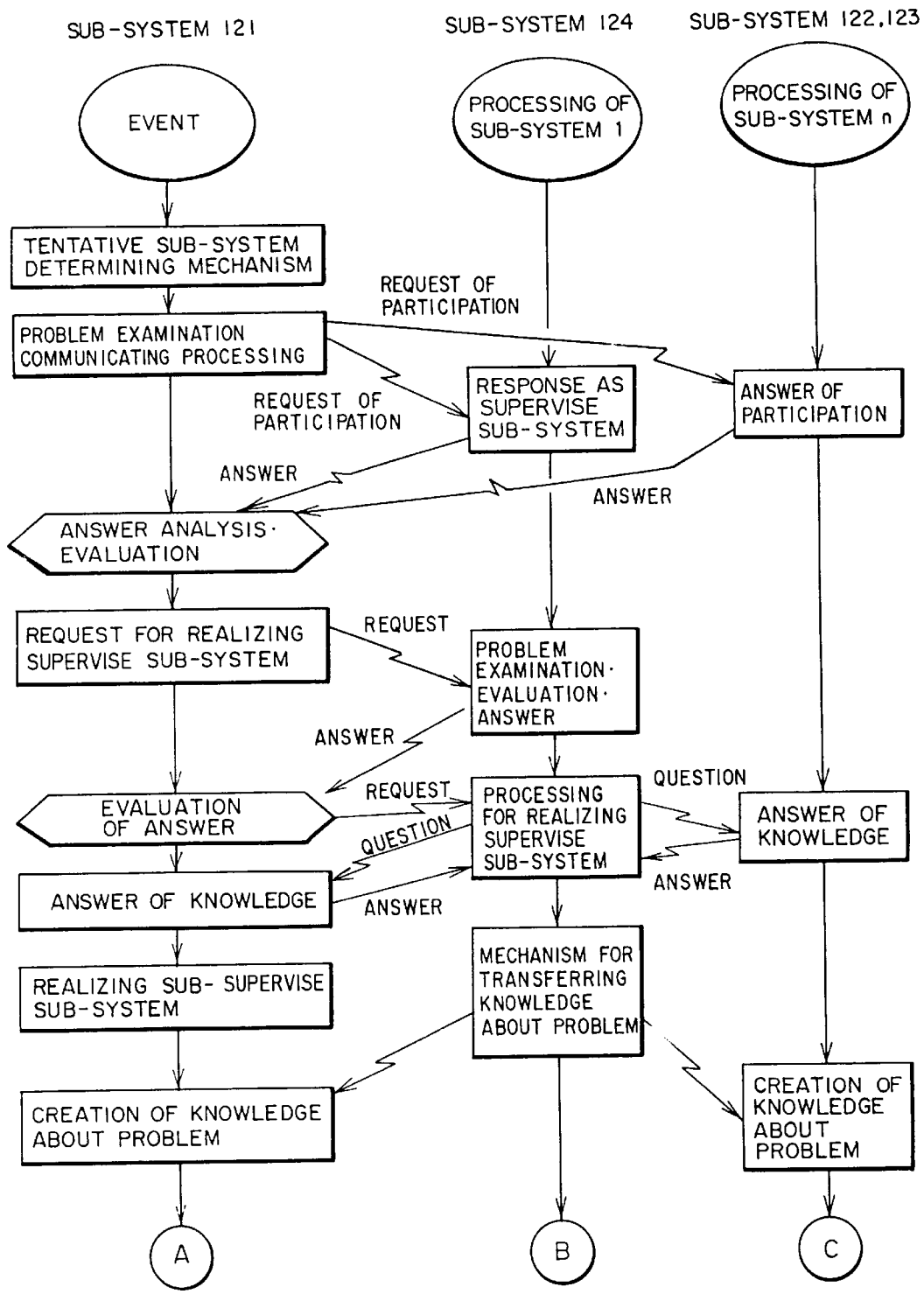

The flow of the processings in the computer systems 121 to 125 for the event will be explained with reference to FIG. 19.

The event is received by the event processing 22 in the sub-system management processing 20 in FIG. 3; the factors due to which the control model is greatly out of order are decided to execute the model identifying processing in FIG. 18. Also, in response to the event, the computer system 121 executes the processing of the cooperative mechanism 23 in FIG. 4. The initial processing in this processing is the cooperative pre-processing 30 in FIG. 5 in which the tentative unifying sub-system is set through the event decision 35. The process including these steps 35 to 37 is referred to as a tentative unifying sub-system determination mechanism in FIG. 19A.

Thereafter, the computer system 121 adopted as a tentative unifying sub-system executes the problem examining/transmitting processing 38 in FIG. 5. As a result, that the control model is greatly out of order, i.e. the message that the cooperative mechanism is activated, is communicated to the network 126, and hence the computer systems 122 to 125 in FIG. 17. Then, the computer system 124 (sub-system), which does not directly control each roller and has a low load rate, answers, in the steps 56 and 59 in FIG. 7, with the load rate at this time to the computer system 121 that it applies for the cooperative mechanism as a supervising sub-system.

On the other hand, the computer systems (sub-systems) 122 and 123, which directly control the corresponding rollers, in response to the message that the control model is greatly out of order, activate the model identifying processing for the corresponding rollers. Thus, the computer systems 122 and 123, which do not have clearance of its capability, executes the step 50 due to the decision 47 in FIG. 6, namely conveys to the computer system 121 the information that they participate in the cooperative mechanism as general sub-systems. These answers are decided in the step 39 in FIG. 5. On the basis of the decision that the computer system 121 does not have clearance in the processing capability (most of the processing capability is consumed for the model identifying processing 121), the computer system 121 asks the computer system 124 to execute the unifying processing and becomes a sub-unifying sub-system through the steps 43, 44 and 45 to back up the computer system 124 as a unifying sub-system.

When the computer system 124 becomes a unifying sub-system, it makes questions for the other sub-systems through the step 31 and the steps 76 and 78 in FIG. 10; when the sub-systems execute the knowledge response processing 51 about themselves in FIG. 6, the unifying sub-system 124 generate the knowledge about the relevant sub-systems through the steps 79 and 80 in FIG. 5. This knowledge includes several items such as the meaning network of the conversation model, a production rule described by the form of If—then, etc., but the differential equation simplified for the roller is now taken. In this case, in the model identifying processing in FIG. 18, the model is minutely expressed by a high order differential equation, whereas the knowledge about the sub-systems is expressed by a low order differential equation which is roughly approximated but does not deviate so greatly from their operation. For example, the oil pressure depressing devices 117, 118 and the speed control devices 119 and 120 are expressed by one-order approximation of $$K/(1+Ts)$$

The computer system 124 generates a goal for the control model thus roughly approximated by solving a linear scheme problem and DP (dynamic programming) problem so that the entire system is optimized, and conveys the goal value to the other computer systems 121, 122 and 123 (step 62 in FIG. 12).

In response to this, the computer systems (sub-systems) 121, 122 and 123 decide if the goal can be attained using the the detailed model obtained by the model identifying in FIG. 18 and the parameters provided from the control computer 101F for hot rolling system 107 in FIG. 16. If the goal can be attained, further processing clearance is replied to the computer system 124 which is a unifying sub-system ; if not, the rate of not attaining is replied thereto.

Figure 19B:
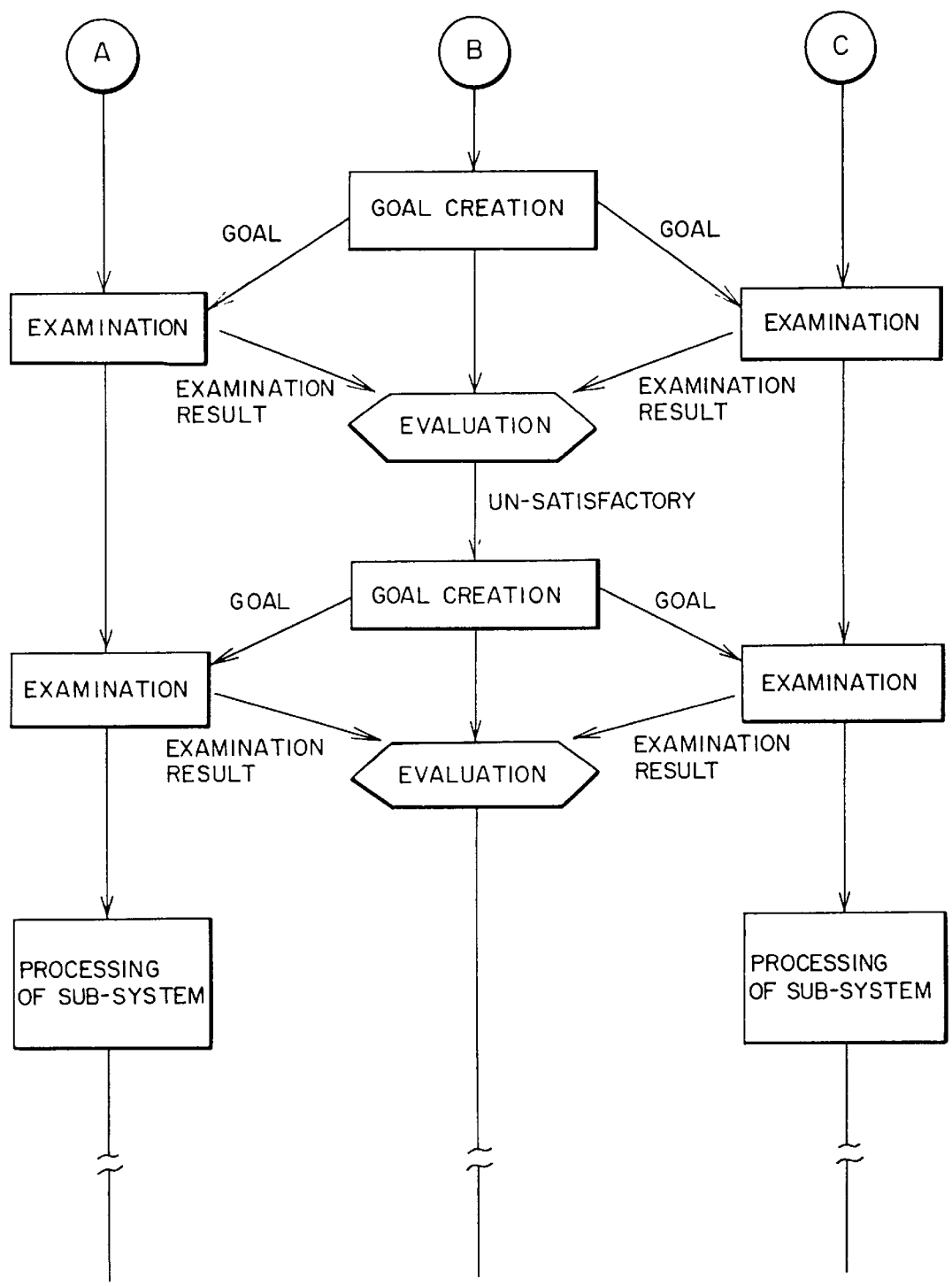

In the case of FIG. 19B, as a result of the evaluation of the examination result from each computer system (sub-system), if it is decided that the load of the computer system 121 for the first stand exceeds a limit, those in the computer systems 122 and 123 for the second and n-th stands have clearance, an optimum scheme problem is solved under a new condition again to set s new goal. The computer systems 121, 122 and 123, which are general sub-systems are asked to examine the goal, and then examine the goal using their own knowledge to reply the examination result (satisfaction of the goal and clearance of the load).

The flow of information between the unifying sub-system and the general sub-systems in FIG. 19 will be explained with reference to concrete numerical values listed in FIG. 20. Now it is assumed that that the states of the computer systems before entering the cooperative mechanism are the plate thickness of 2.5 mm and the consumed power of 1000 KW in the roller controlled by the computer system 121; the plate thickness of 1.0 mm and the consumed power of 800 KW in the roller controlled by the computer system 122; and the plate thickness of 0.8 mm and the consumed power of 800 KW. If the rated consumed power for each roller is 1200 KW, it is meant the roller corresponding to the the computer system 121 is operated in the state with very small clearance. When entering the cooperative mechanism, the supervising sub-system (computer system) obtains a goal (1) (plate thickness) for each sub-system (computer system) by solving the scheme problem, and reports it to each sub-system. In response to this, each sub-system replies the estimated consumed power (examination result) in the corresponding roller. In this case, considering the present operating state, the computer system 121 asks the supervising sub-system to set a goal with the possible highest clearance. In response to the examination results, the supervising sub-system sets a new goal (goal (2) in FIG. 20) for each sub-system and reports it thereto. Thus, each sub-system replies to the supervising sub-system that the goal can be attained.

Figure 21:
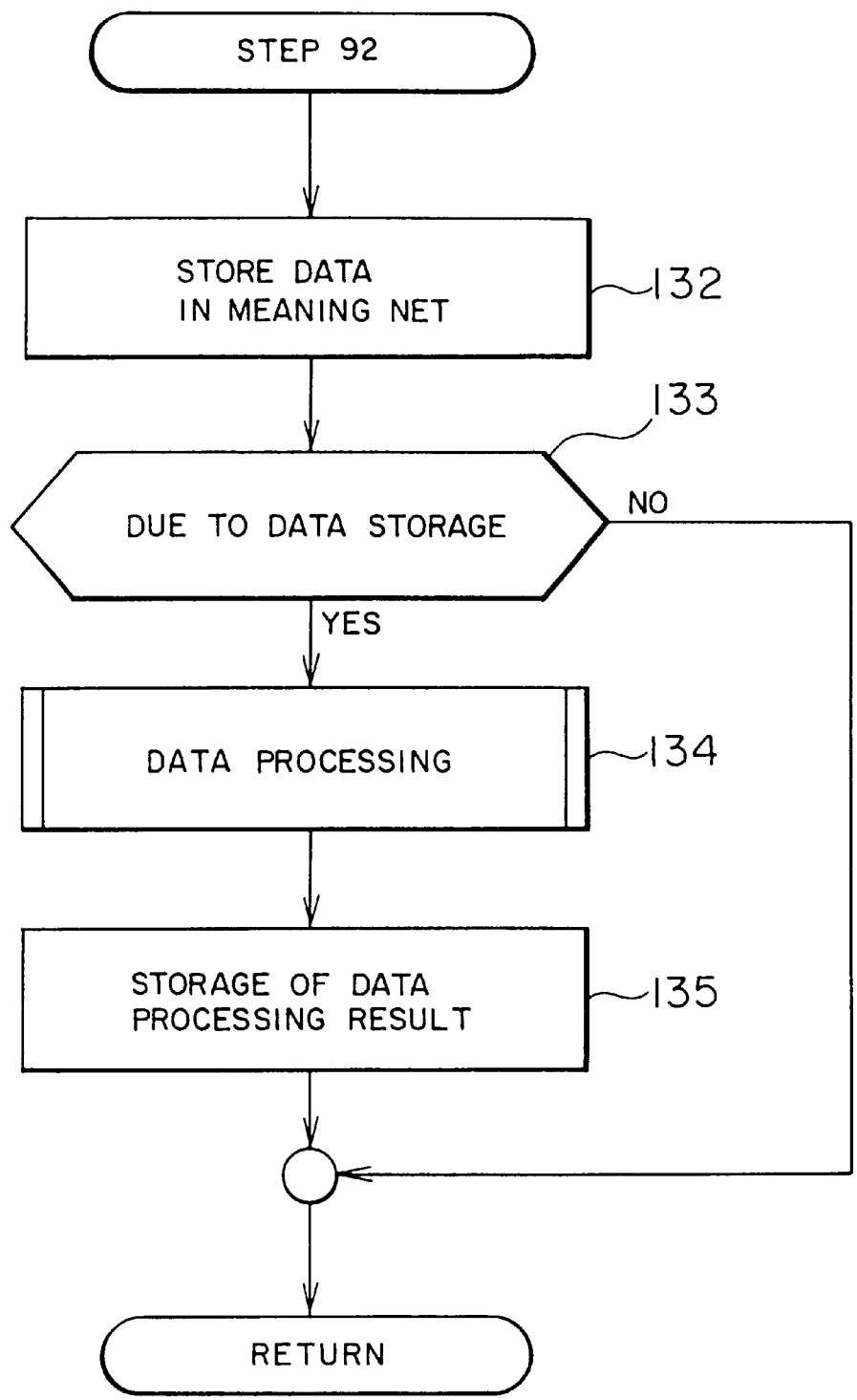

FIG. 21 is a flow chart showing the details of the step 92 in FIG. 13. In step 132, data sent from the other sub-system and taken from the input/output device of the sub-system at issue are stored in the slot of the frame of the meaning network. When the data have been stored in the slot, in step 133, decision is made from the attendant information stored in the slot on if a predetermined processing included in the attendant information should be activated. If the processing should be activated, in step 134, it is activated to provide the data processing result. In step 135, the data processing result is stored in the slot of a predetermined frame which is recorded as the attendant information of the storing slot or the attendant information of the above predetermined processing.

Figure 22:
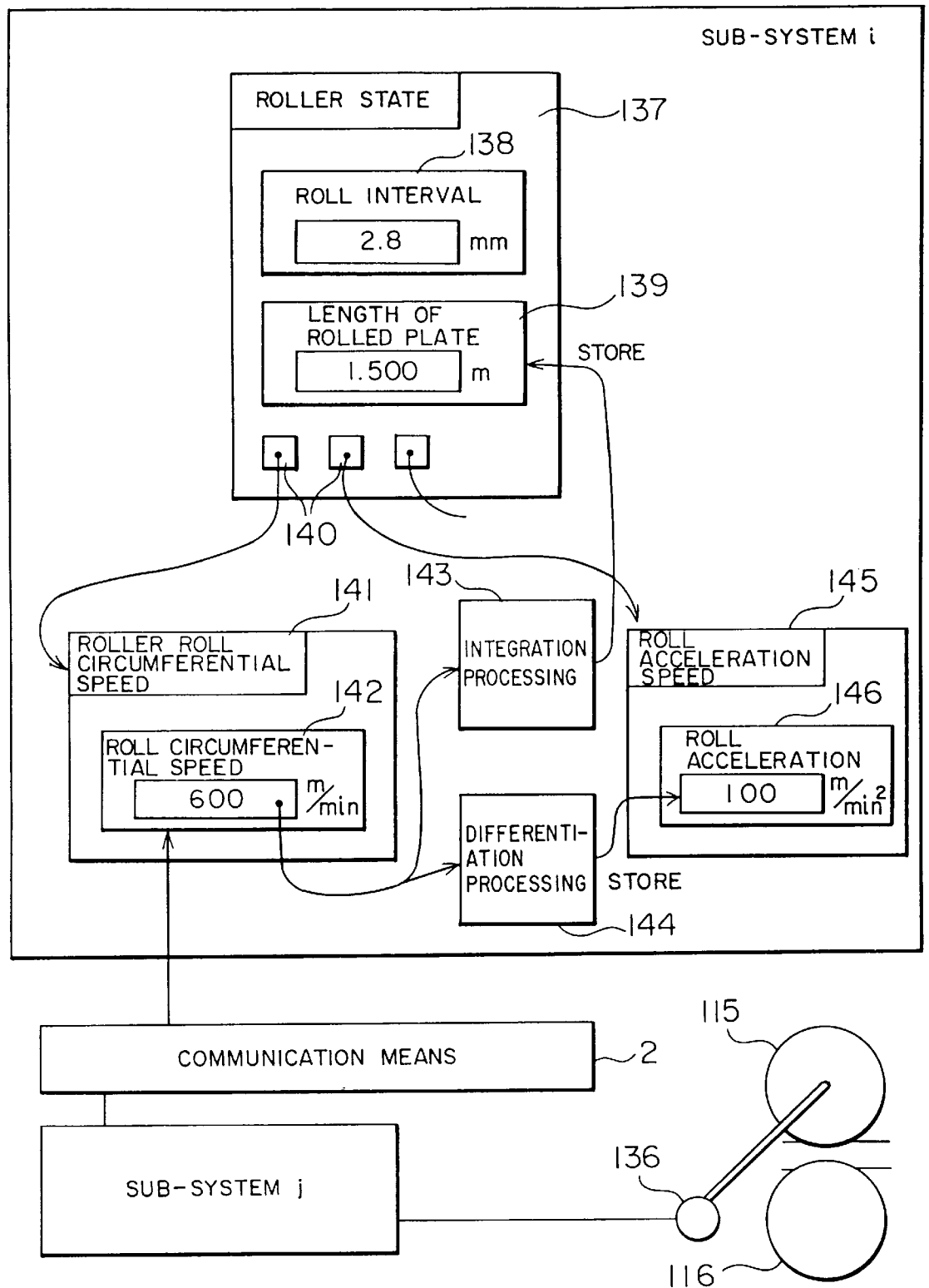

The flow of the above processing 92 will be explained with reference to FIG. 22 in which concrete numerical data are provided.

The speed meter 137 connected with the rolls 115 and 116 in of a roller produces an output proportional to the circumferential speed of the rolls; the output is supplied to a sub-system j through an interface circuit. The above data are subjected to several processings (e.g. filtering in the case where the system is used in noisy environment) in the sub-system and sent to a sub-system i through the communication means 2.

On the other hand, a roller state frame 137 which is constituted by a meaning network for the conversation model is composed of a roll interval slot 138, a slot 139 for the length of the rolled plate, and links 140 for lower and upper concepts for constituting the network. The roll interval of 2.8 mm is stored as a concrete value of the slot.

A roller roll circumferential speed frame 141, which is a component of the above roller state 137, is a lower concept of the roller state 137 as understood from the link 140; stored in a roll speed slot 142 is the corrected value for the speed meter, e.g. 600 m/min. which is stored through the communication means 2 in the step 132 in FIG. 21.

In this case, the attendant information in the roll circumferential speed slot 142 is linked with the processings (integration processing 143 and differentiation processing 144) which are activated when a value is entered in the slot, so that the decision step 133 activates the integration processing 143 and the differentiation processing 144 to execute the data processing 134.

In receipt of the results of the data processing 134, the result of the differentiation processing 144, i.e. 100 m/min. is stored in the roll acceleration speed slot 146 of a roll acceleration speed frame with which the differentiation processing is linked, and the result of integration processing 143, e.g. 1500 m is stored in the slot 139 in the roller state 137.

Thus, if the roll circumferential speed is provided, it is not necessary to send the values of the roll acceleration speed and the plate length to the sub-system since the roll acceleration speed stored in the sub-system has the integration of the roll speed, and the plate length therein has the integration thereof, thereby reducing the amount of data passing through the communication means 2.

In such an arrangement, the supervising sub-system can be defined by several factors including load, knowledge about problems, etc. and also extension and restoration of data based of knowledge processing, and further, cooperation based on negotiation among respective sub-systems can be realized. Thus, an information processing system with excellent flexibility and extension can be constituted.

Figure 23:
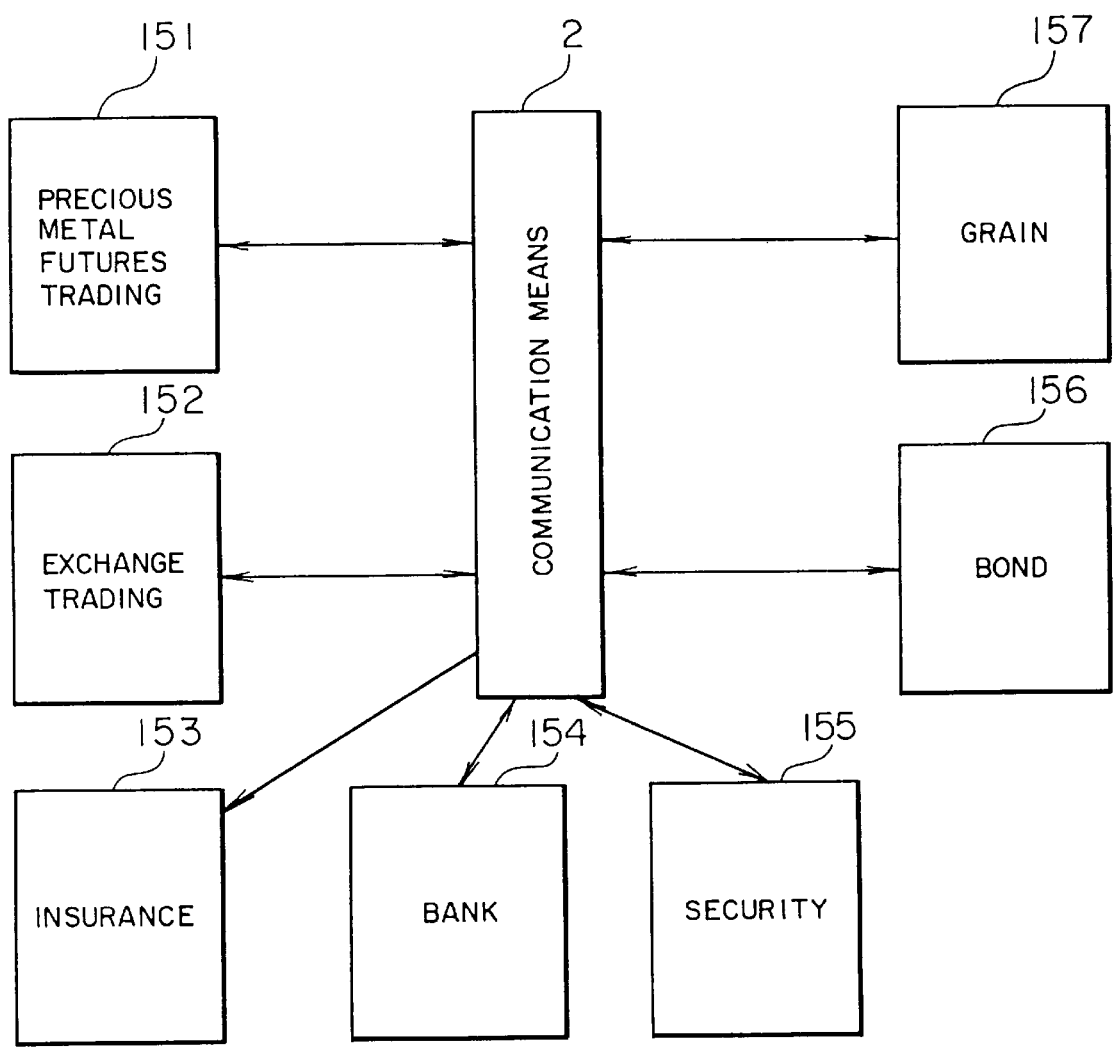
FIG. 23 is a block diagram of the dealing system using the present invention

Meanwhile, with the development of a large scale social system, necessity of data exchange with an industry field for which data communication has not been required as being an unusual industry has been increased. FIG. 23 shows the concept information communication system in 'portfolio' including banking in which clients' funds are used to make profits and increase the funds.

This information communication system is composed of a precious metal futures trading sub-system 151, an exchange trading sub-system 152, an insurance sub-system 153, a banking sub-system 154, a security sub-system 155, a bond sub-system 156, a grain futures trading sub-system 157, and communication means 2.

When in such a system, a client who wants to use the fund of α yen comes to a teller's window of a bank, the bank sub-system activates the the sub-system management processing 20 in FIG. 3.

Figure 24:
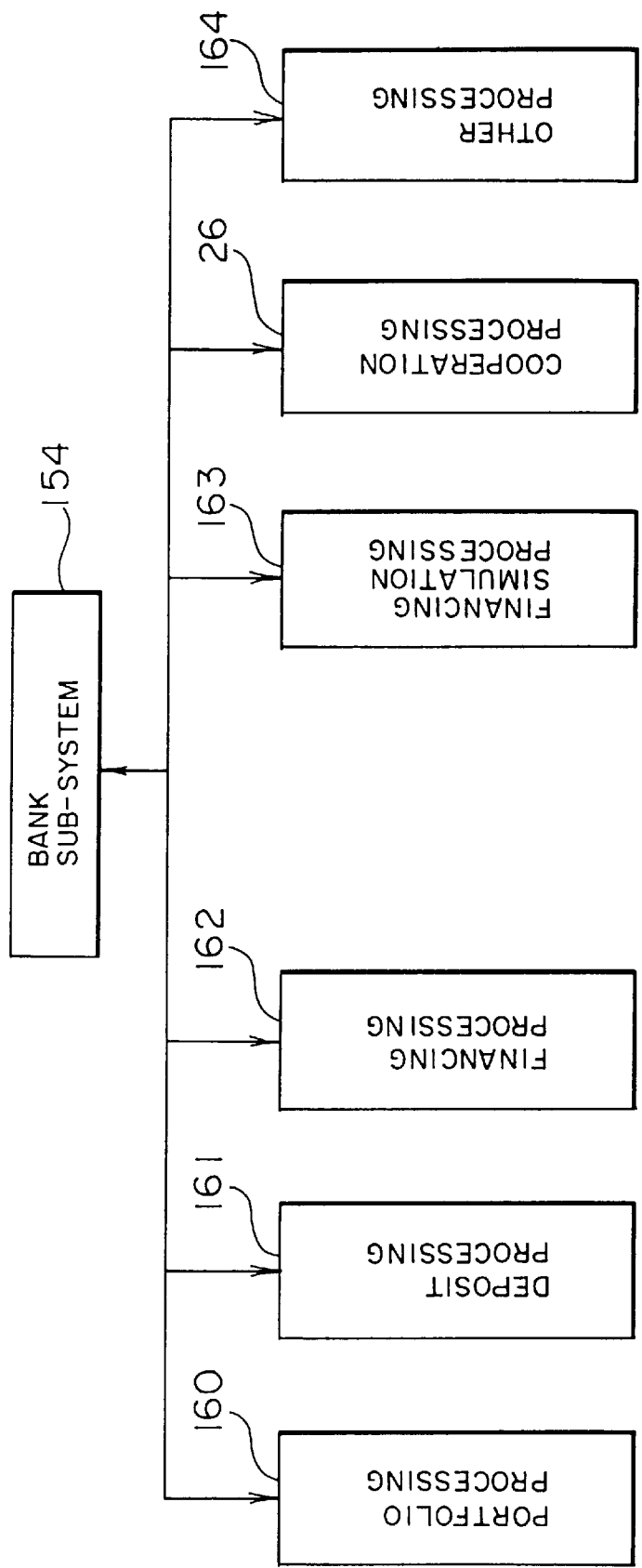
FIGS. 24 and 25 are block diagrams of the processing organization in a bank sub-system and a bond sub-system, respectively.

The sub-system processing 27 in FIG. 3 in the banking will be explained as the bank sub-system in FIG. 24.

When the bank sub-system 154 is asked to provide an optimum solution for using the funds of a user, a portfolio processing 160 is activated. In receiving the result of this processing, a deposit processing 161 is executed. If the financing or loan is necessary, a financing processing 162 is executed. When the simulation such as future trend of interest rates is required considering the the portfolio processing 160, the processing therefor is executed. When the cooperation with the other sub-system, e.g. the security sub-system 155 is required, the processing 26 therefor is executed. The other processing 164 is also executed.

Figure 25:
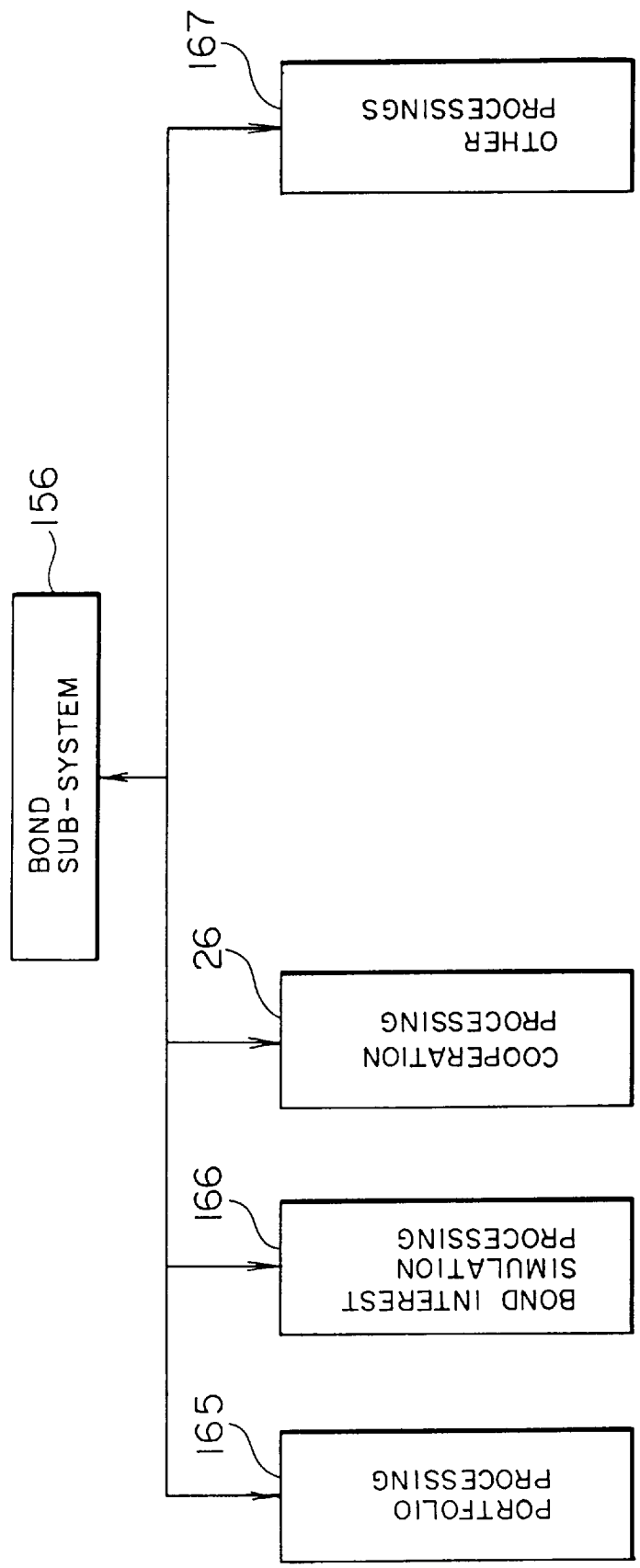

The bond sub-system 156 when the sub-system processing 27 in FIG. 3 is applied to the bond trading will be explained referring to FIG. 25.

The bond sub-system 156 is composed of a portfolio processing 165 for deciding the investment efficiency of a client, a bond interest simulation processing 166 for acquiring the influence for bond interest from several kinds of external factors, the cooperation processing 26 in FIG. 3 and the other processing 167.

Now it is assumed that a client has come to the bank to ask the efficient use of α yen. In this case, the bank sub-system 154 acts as a supervising sub-system to ask the other sub-systems to participate in the cooperative mechanism. Incidentally, when a client ask a security firm to use his fund, in many cases, the security sub-system 155 acts as a supervising sub-system considering the cost of information required for transaction with the other sub-systems.

The bank sub-system 154 acting as a supervising sub-system roughly determines the investment sum on the basis of the risk rate or profit rate in several kinds of investment systems. Then, if the investment sum for the bond has been defined, the supervising sub-system 1 (bank sub-system 154) informs the general sub-system 3 (bond sub-system 156) of the investment sum. The bond sub-system 156 obtains the profit from the investment sum considering the environment around the investment.

Figure 26A:
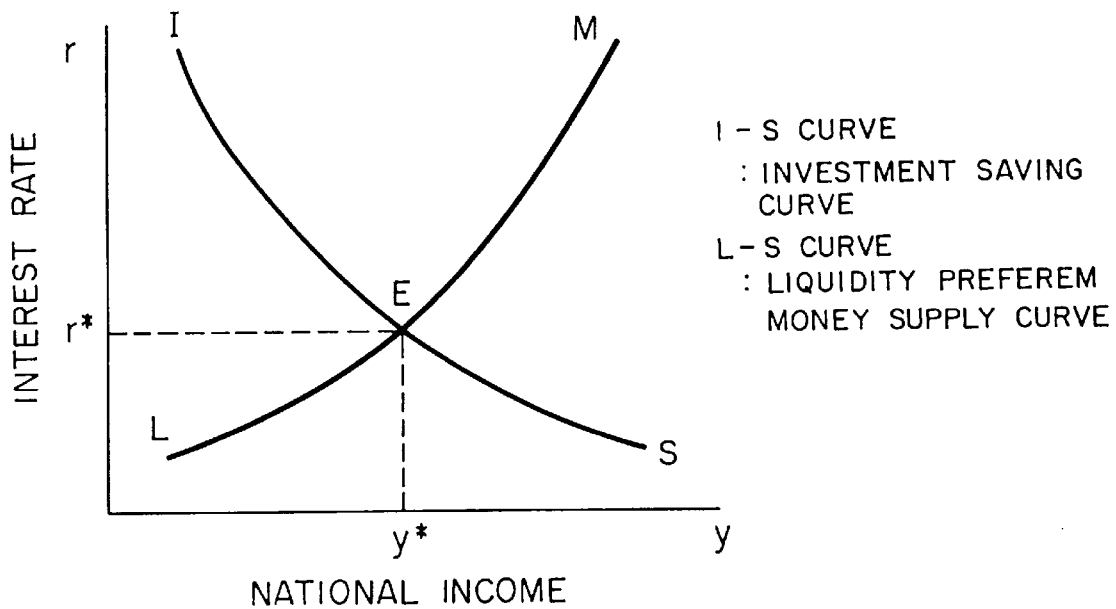
FIGS. 26A and 26B are graphs showing the relations between investment and saving and between money and flow preference/money supply.

More specifically, the bond sub-system 156 includes non-linear curves between the substantial national income and the interest rate of national bonds which allow them to be simultaneously determined, as shown in FIG. 26A. I-S curve indicates the relation between the investment and saving, i.e. a set of the interest rate r and the substantial national income y which make equal the investment and the saving. For example, if the national income increases, the savings of a nation increases and so the interest rate decreases. Thus, the I-S curve is a rightwardly descending curve. L-M curve indicates the relation between liquidity preference and money supply. For example, assuming the substantial money supply (amount of money supply/price index), if the substantial national income increases, the asset demand for money decreases, and so the interest rate increases. Thus, the L-M curve is a rightwardly ascending curve. The interest rate r* and the substantial national income y* at an intersecting point E (balancing point) of the I-S curve and the L-M curve balance in a bond market.

Figure 26B:
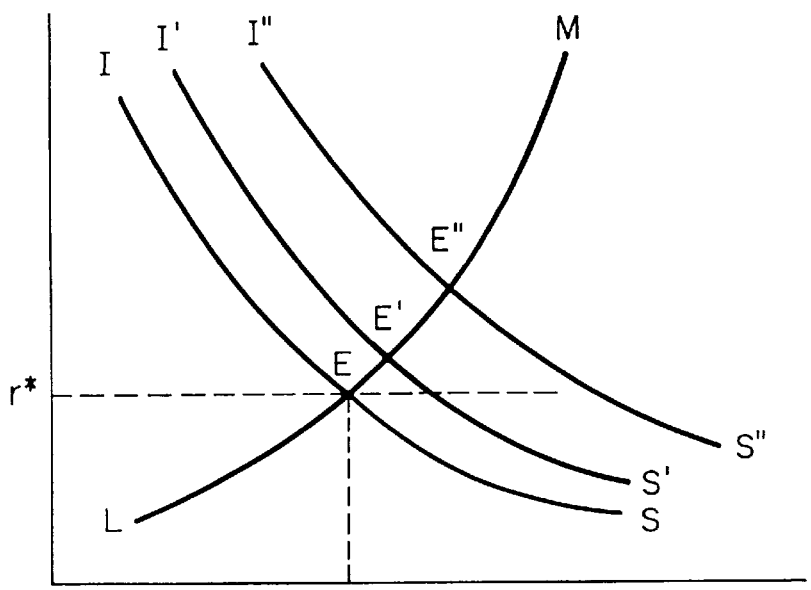

FIG. 26B shows the shift of the balancing point due to tax reduction and issue of national bonds (commercial consumption). For example, if the tax reduction is carried out under the condition that the interest rate is fixed, the national income increases exponentially. In a limited model, the tax reduction of 1 trillion yen increases the national income by $C_1/(1-C_1)$ trillion yen ($C_1$: marginal consumption trend which is the rate directed to consumption in the increased income). As a result, the I-S curve shifts to I"-S' curve or I"-S" curve. The commercial consumption of bonds has the same effect as the tax reduction since it reduces the money supply and increases the interest rate. On the basis of the graphs in FIGS. 26A and 26B, the interest rate at an investment timing can be determined by several factors including the investment, saving, liquidity preference, money supply, national income, etc. The interest rate at the balancing point E can be acquired by an algorithm such as the Newton-Rapson method. In this case, the know-how such as several kinds of correction terms is added to enhance the accuracy of the simulation so that the operation time will increase. Further, the program for the simulation is a company secret of the company possessing it; the program can be utilized, but the program itself is not allowed to be used in an external computer. Therefore, in order to provide the simulation result with high accuracy, the cooperative mechanism 23 for asking each sub-system to make the simulation and providing the results thereof is required.

Figure 27:
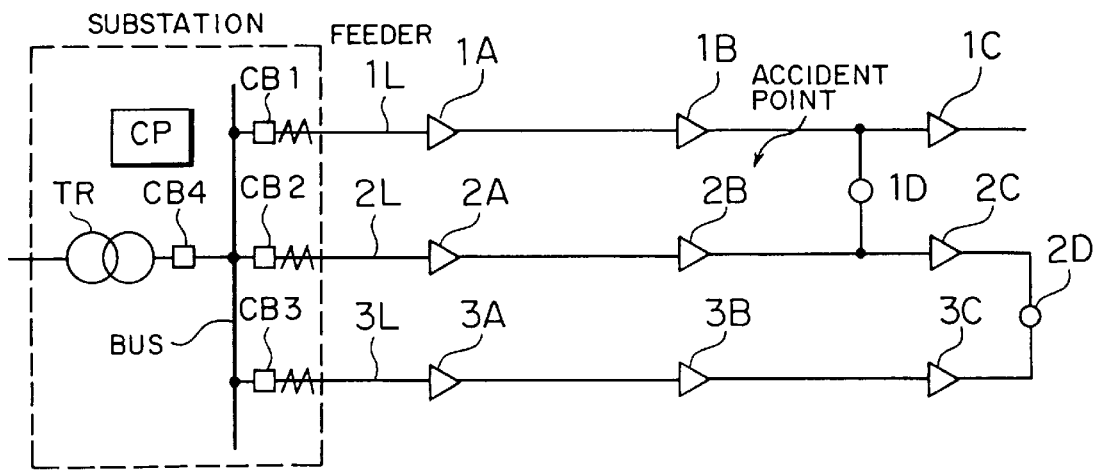
FIG. 27 is a diagram showing the power distribution system using the present invention.

Another embodiment of the present invention will be explained with reference to FIG. 27 showing a part of the power distribution routes in a remote control system therefor. Now it is assumed that electric power is supplied to a feeder 1L, (also feeders 2L and 3L) and through a transformer TR, breaker CB4, bus, breaker CB1 (breakers CB2 and CB3) which are located in a distribution substation. The feeder 1L is composed of four sections connected by section switches 1A, 1B and 1C and is adapted to connect with the feeder 2L through a communicating switch 1D which is opened in the normal state. The feeders 2D and 2L are composed of four sections by section switches 2A, 2B and 2C, and section switches 3A, 3B and 3C, respectively; the feeders 2L and 3L are adapted to connect with each other at their ends by a communication switch 2D which is opened in the normal state. Each section switch is provided with is a communication slave office TP for remote control which is connected with a substation slave office CP through a communication line or distribution line carrier.

Figure 29:
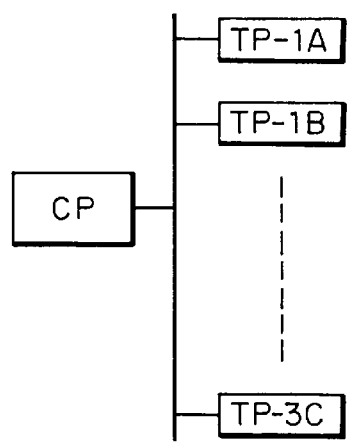

FIG. 28 to 30 show communication systems each comprising a master office CP and slave offices TP's; FIG. 28 shows the connection in a star shape; FIG. 29 shows that in a bus shape; and FIG. 30 shows that in a loop shape. In all arrangements of FIGS. 28 to 30, the master office and the slave offices are connected through a bi-directional communication path so that the communication of 1:1 and 1:N can be implemented.

Figure 31:
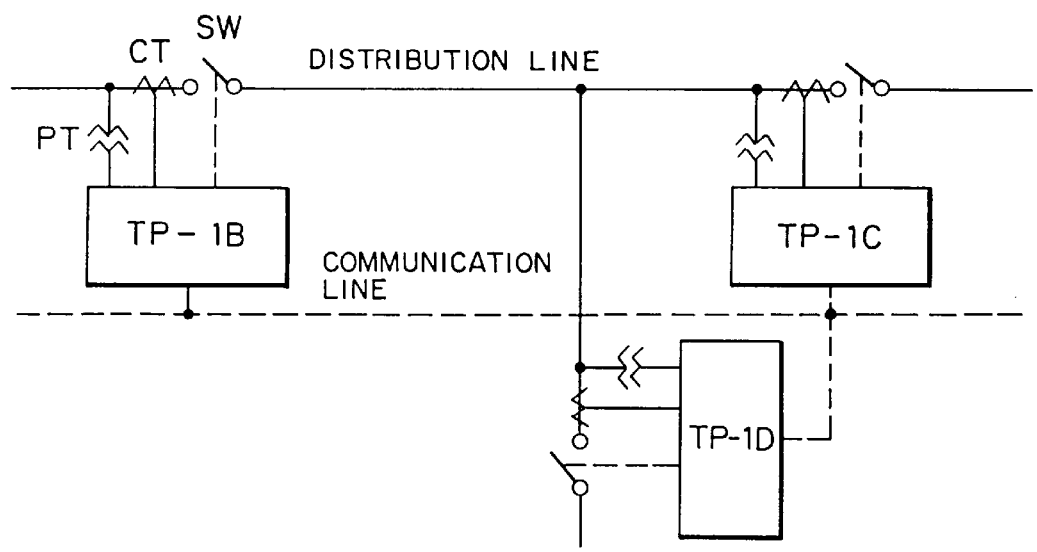
FIG. 31 is a diagram showing the arrangement of the segment switches and transmission slave offices provided in a segment of the power distribution system.

FIG. 31 shows the arrangement of power distribution equipment and communication equipment for the section switches 1B, 1C and 1D on the feeder IL. The slave office is adapted to make signal exchange with a communication line and its substitutive communication medium in accordance with a prescribed procedure in response to the input signals from voltage detection means PT and current detection means CT on the distribution line and an input/output signal from a switch SW on the distribution line.

Figure 32:
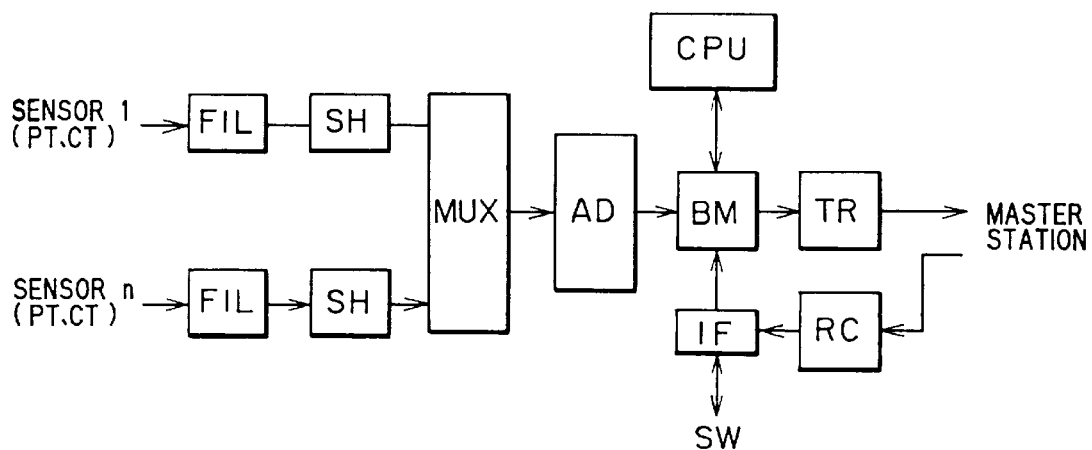
FIG. 32 is a block diagram of an example of the hardware of the slave office.

FIG. 32 shows an arrangement for the the above signal exchange, in which a signal from each input means is input to a processor CPU through a filter FIL, a sample holder SH, a multiplexer MUX, an A/D converter AD and buffer memory BM, or through an interface circuit IF, a transmitter TR, etc.

Each slave office has part or all of the functions of measuring the voltage, current, phase angle on the distribution route, operating the switches or informing the state thereof, and detecting accidents and the abnormality of the devices.

Figure 33:
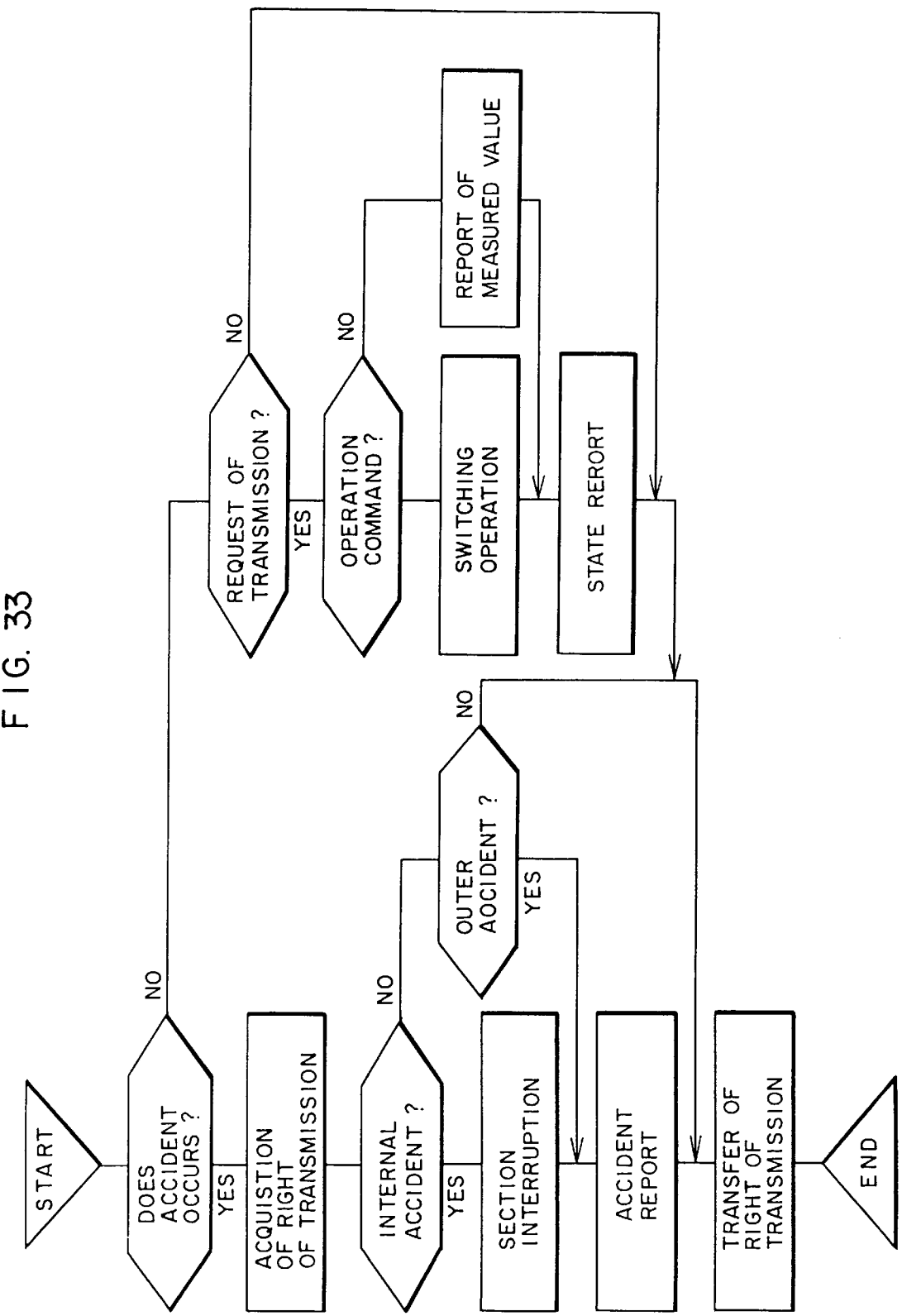

FIG. 33 is a flowchart of the processing procedure in the processor CPU. This processing procedure is composed of a normal time routine for switching operation and measurement, and accident time routine. A timing chart of the processing procedure and transmission signals is shown in FIG. 34. Now it is assumed that the communication system in the form of FIG. 30. In the normal time, the distribution substation master CP has a right of transmission and so requires the respective slave offices TP-1A to 1C to the measured values. In response to this, the respective slave of f ices TP-1A to 1C to the measured values. In response to this, the respective slave off ices transmit the measured values in a prescribed order.

On the other hand, when the slave of f ice TP-1B detects that an accident has occurred in a section enclosed by the swithes1B, 1C and 1D in the distribution route in FIG. 27, it acquires a right of transmission to require the adjacent slave offices TP-1A, 1B and 1C to transfer the accident information. The accident at the respective slave offices can be detected by several techniques, e.g. detection of a short-circuit accident using an excess current relay, detection of a ground accident using the combination of a short-circuit direction relay and a ground excess current relay as disclosed in DENKIGAKKAI DAIGAKU KOZA "HOGO KEIDEN KOGAKU" page 199 (Showa 56, July). The detection of the accident section can be made, as disclosed in JPA-62-1777462, by comparing the magnitude of the current or its phase angle f or the voltage in the slave office TP-1B with that in the slave offices TP-1A, 1B and 1D thereby to decide that the section where the above magnitude or phase angle has abruptly varied is an accident section. When the decision that the accident is an internal accident occurred at the section at issue could be made, if the section switch 1B has a capability of interrupting the accident current, it immediately cuts of the accident section and informs the other offices of this fact. If the section switch 1B does not have a capability of interrupting the accident current, it informs the slave office CP of the accident information to open the breaker CB1 on the accident line. After having received the accident information, the master office CP acquires the right of transmission to ask the respective slave offices to report the connection state of the corresponding switches. The master office CP takes an optimum procedure on the basis of the above accident information and connection information of the section switches to provide an operation command to the corresponding slave office.

In the above embodiment, a communication system is composed of the master office CP and a plurality of the slave offices TP-1A to 1D; in the normal state, CP acting as a supervising sub-system having the right of transmission collects the information necessary to run the system, e.g. the measured values in the slave offices and the states of the switches, whereas in the accident state, one of the slave offices acts as a supervising sub-system to collect the information necessary to decide the accident. Therefore, in the prior art, it takes a long time to decide the accident since the master office collects all the items of accident information about the slave offices, whereas in this embodiment, the slave office at issue acts as a supervising sub-system to collect necessary but minimum information which allows the accident to be decided at a high speed.

Further, in the prior art, if any trouble occurs in the master office, the system is obliged to stop the function thereof. On the other hand, in this embodiment, the slave office in the neighborhood of an accident point act as a supervising sub-system so that it can collect the accident information and decide the accident to carry out the processing necessary to deal with the accident, e.g. separation of the accident section, thereby greatly enhancing the reliability of the system. Also in the case where one of the slave offices in the neighborhood of the accident point is in failure state, it is apparent that the other sound slave office can handle the accident.

Now referring to FIGS. 36 and 37, explanation will be given for an embodiment of adding or removing a slave office owing to the repair work or set-up work of a distribution line in the distribution system of FIG. 27.

It is assumed that as seen from FIG. 36, a branch line is provided on the way between the switches 1A and 1B to newly provide a switch 1E and the corresponding slave office TP-1E. In the transmission system of FIG. 37, the slave office TP-1E has only to be be added on the loop. The processing procedure in this case is not explained here. It should be noted that the data corresponding to the TP-1E has only to be included in the transmission data in the normal routine in the timing chart of FIG. 34. As in the previous embodiment, the added slave office acts as a general sub-system in the normal time and as a supervising sub-system when an accident has been detected.

Moreover, in this embodiment, the switch and the corresponding slave office can be removed without hurting the entire information processing function; for example if the communicating switch 1D is to be removed, the slave office TP-1D has only to be bypassed in the transmission system.

In this way, in accordance with this embodiment, the sub-system can be easily added and cancelled so that it can provide the same effect as the previous embodiment as compared with the prior art.

Further, although in the previous embodiment, as shown in FIGS. 28 to 30, the slave offices TP-1A to TP-1C in all the lines are connected with the master office CP through transmission paths, in this embodiment, as shown in FIG. 38 (corresponding to FIG. 28) and FIG. 39 (corresponding to FIG. 30), a layer or hierarchical structure in which repeater stations LP1 to LP3 are provided for each line and a substation master office is further provided for the repeater stations can be adopted. In this embodiment, one of the repeater stations LP1 to LP3 and the slave office belonging to each line constitute an information processing system, and further the repeater stations LP1 to LP3 constitute an upper rank information processing system together with the substation master office CP. The sub-system including LP1 will be explained regarding CP in FIG. 35 as LP1. The master offices LP1 to LP3 can be realized by the same monitor control device as the substation master office CP which is independent as hardware, otherwise realized by software exchanging signals as a part of the substation master office CP or the slave office TP.

In FIG. 39, during the normal time, the substation master office CP acting as a supervising sub-system asks the repeater stations LP1 to LP3 to send the measured value and state monitoring information for each line in accordance with the procedure with the slave offices TP's in FIG. 34 replaced by the LP1 to LP3. In response to this, the repeater station LP1 acquires the right of transmission to act as a supervising sub-system; the repeater station LP1 collects the information about slave offices TP-1A to TP-1D in accordance with the same procedure as described in the previous embodiment, and the information, after having been subjected to necessary conversion by the repeater station LP1, is transferred to the substation master office CP.

On the other hand, when an accident occurs, the slave office in the neighborhood of the accident point acts as a supervising sub-system to report the accident information to the pertinent repeater station. For example, if an accident has occurred at the section as shown in FIG. 27, the repeater station LP1 in the system of FIG. 39 acts as an supervising sub-system to report the accident information to the substation master office CP and the other repeater stations LP2 and LP3. Further, if the pertinent switch must be operated owing to the accident, the substation master office acts as an supervising sub-system to send an operation command to the pertinent slave office via the pertinent repeater station. Incidentally, a part or all of the monitor control functions of the substation master office may be transferred to any of the repeater stations LP1 to LP3 thereby to make unnecessary the communication with the master office CP.

As shown in FIG. 40, the substation master office CP is further connected with a monitor control system consisting of offices and control offices at a high rank. In FIG. 40, CP1 to CPn are equipments having the function of data transmission/reception and remote monitor control for the corresponding substation master offices. P1 to Pn are control equipments in charge of the practical use, maintenance, planning of the entire power distribution system.

This embodiment has an advantage that layering of the sub-systems permits optimum function dispersion and cooperation control for the entire system to be realized while holding the high speed response and high reliability for control.

In accordance with the present invention, the amount of processing information can be remarkably reduced as compared with the prior art concentration type information processing system by using the inherent function of the sub-systems without concentrating the information processing function at the supervising sub-system by means of the negotiation function between the supervising sub-system and general sub-systems in which the general sub-systems perform their inherent function and the supervising sub-system evaluates the processing results of the general sub-systems. Moreover, since it is not necessary fix the supervising sub-system, a substitution action of the supervising sub-system in the accident time can be done quickly; this can remove the defect of the prior art concentration type that when failure in the supervising sub-system leads to the failure of the entire system.

Further, in accordance with the present invention, extreme reduction in the efficiency of processing information does not result in unlike the autonomous dispersion system with uniform sub-systems, and also the supervising sub-system can be optimized through an negotiation mechanism.

We claim:

1. A method of operating an information processing system having a plurality of systems comprising the steps of:

a) assigning a function to each of said plurality of systems;

b) each of said plurality of systems performing a function and forming a result;

c) each of said plurality of systems evaluating its own processing result and the processing results of each of the other said plurality of systems;

d) selecting a unifying system from any one of said plurality of systems based on an information system processing event and on an operational state of said plurality of systems;

e) said unifying system setting goals for itself and each of the other said plurality of systems and collecting the processing results of each system and evaluating the processing results; and f) said unifying system acquiring knowledge of information about the other systems through the communication with the other systems, and said selected unifying system setting a goal for each system considering said acquired information about the other system.

2. A method of operating an information processing system having a plurality of systems, each having a function, some of said systems having an evaluation mechanism which can evaluate the processing results in the other systems as well as its own processing result, and a goal setting mechanism which can set goals for the other systems as well as for itself comprising the steps of:

(a) selecting a unifying system from said some of said systems based on a predetermined rule;

(b) said selected unifying system setting goals for itself and each of the other said plurality of systems;

(c) said selected unifying system collecting the processing results of said each systems and evaluating the processing results; and (d) said unifying system acquiring knowledge of information about the other systems through the communication with the other systems, and said selected unifying system setting a goal for each system considering said acquired information about the other system.

* * * * *

UNITED STATES PATENT AND TRADEMARK OFFICE
CERTIFICATE OF CORRECTION

PATENT NO.    : 6,073,054
DATED         : June 6, 2000
INVENTOR(S)   : Katayama, et al.

It is certified that error appears in the above-identified patent and that said Letters Patent is hereby corrected as shown below:

Column   Line

18   56    Change "when" to -- where --.

18   60    After "in" insert -- failure --.

Signed and Sealed this

Eighth Day of May, 2001

Attest:

NICHOLAS P. GODICI

Attesting Officer    Acting Director of the United States Patent and Trademark Office